(No Model.)  
11 Sheets—Sheet 4.
B. S. LEWIS.
PAMPHLET COVERING MACHINE.
No. 551,776. Patented Dec. 24, 1895.
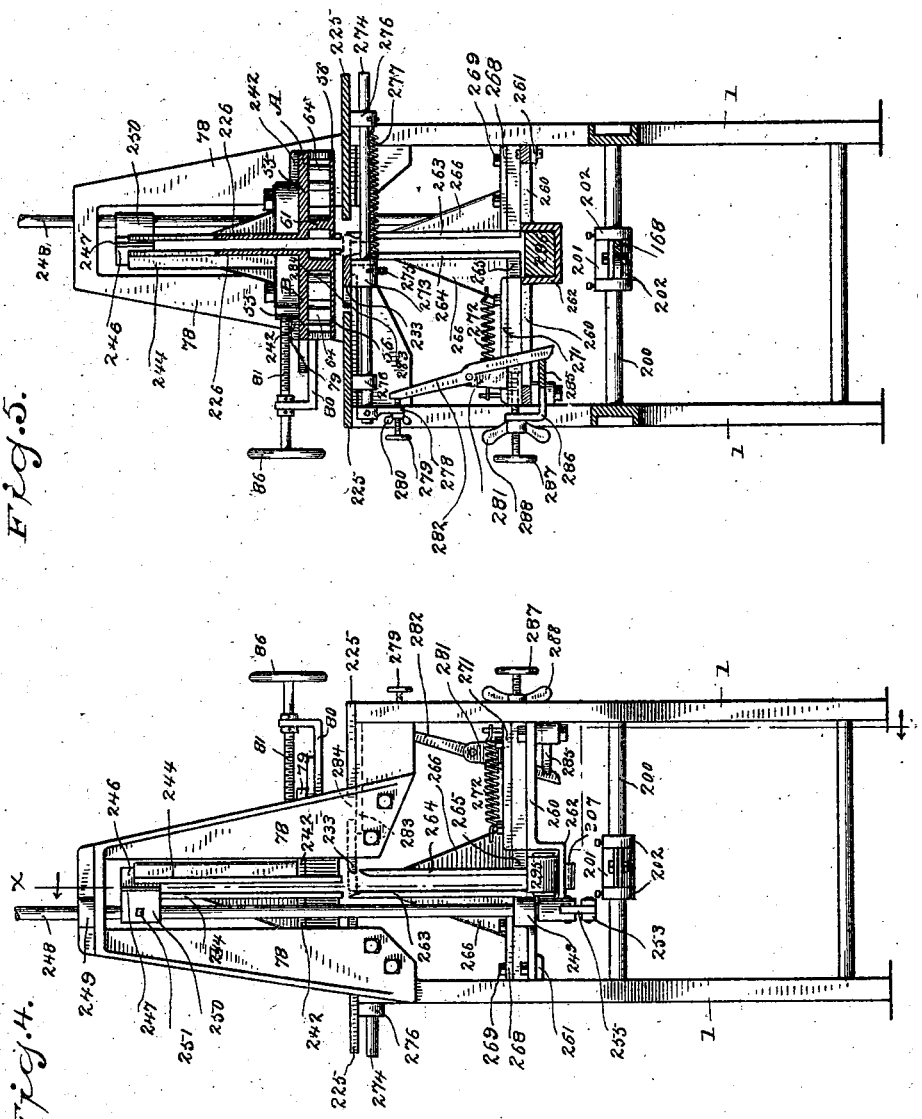
WITNESSES
INVENTOR
Bennett S. Lewis (No Model.) 11 Sheets—Sheet 5.
B. S. LEWIS.
PAMPHLET COVERING MACHINE.
No. 551,776. Patented Dec. 24, 1895.
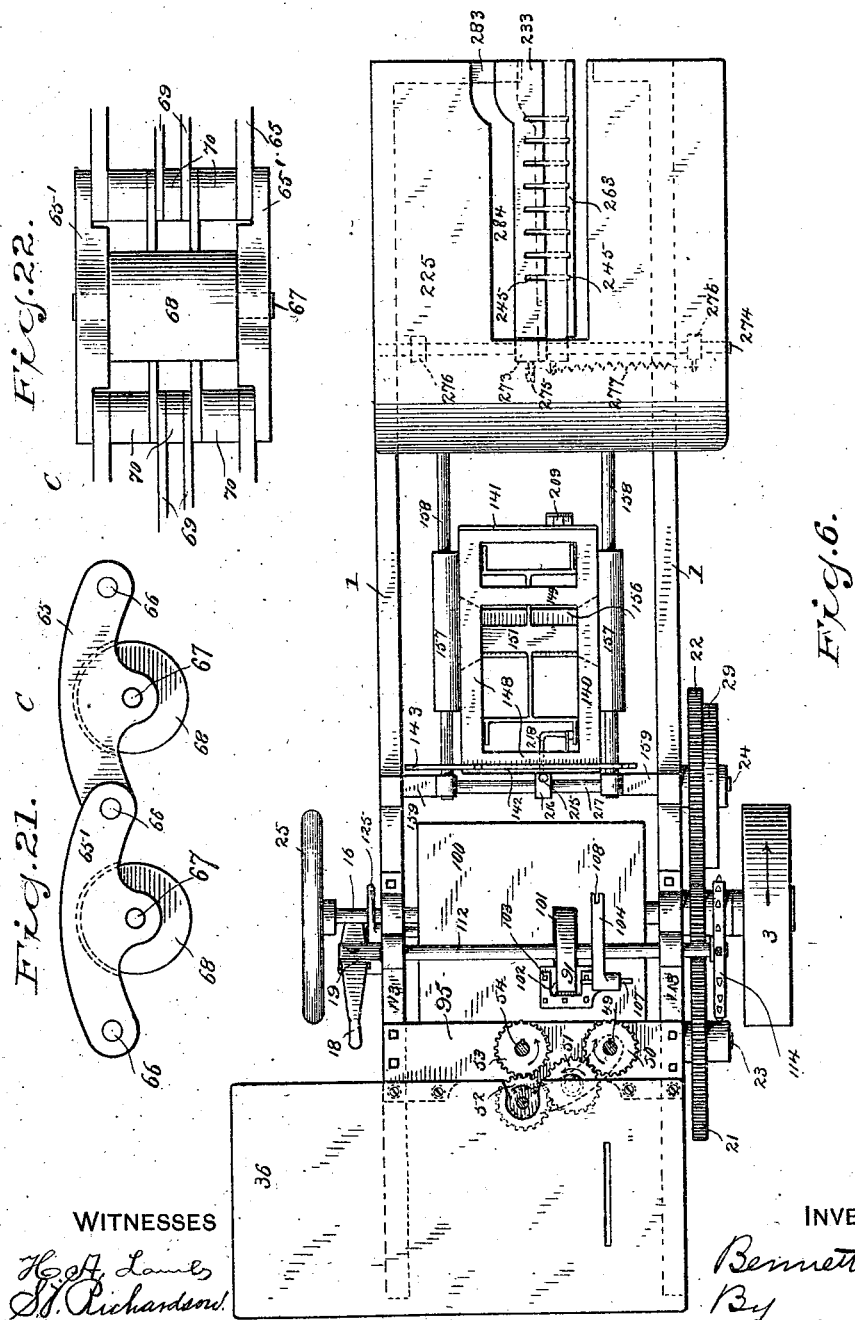
WITNESSES
INVENTOR
Bennett S. Lewis
By
A. M. Wooster
Atty.

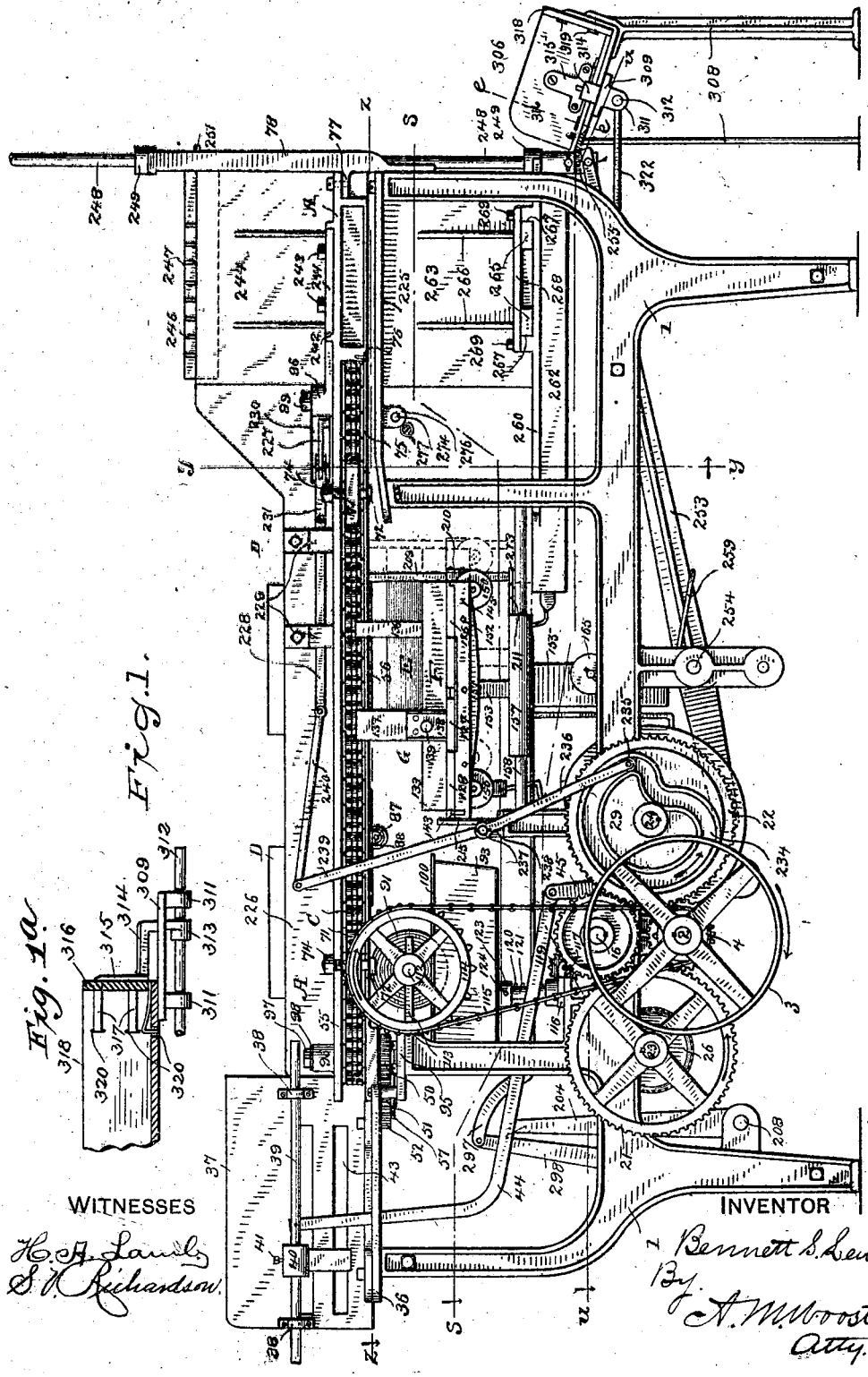

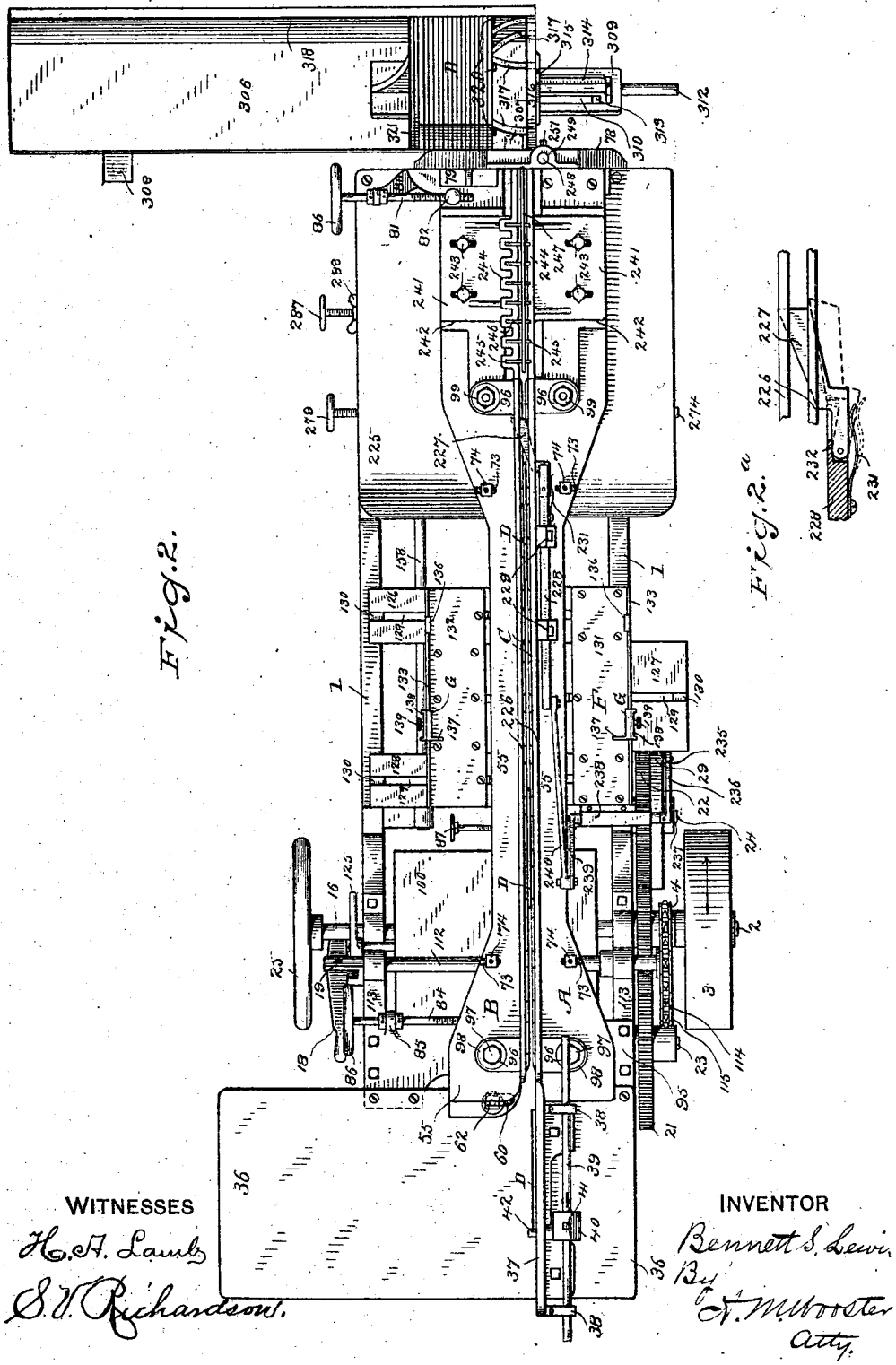

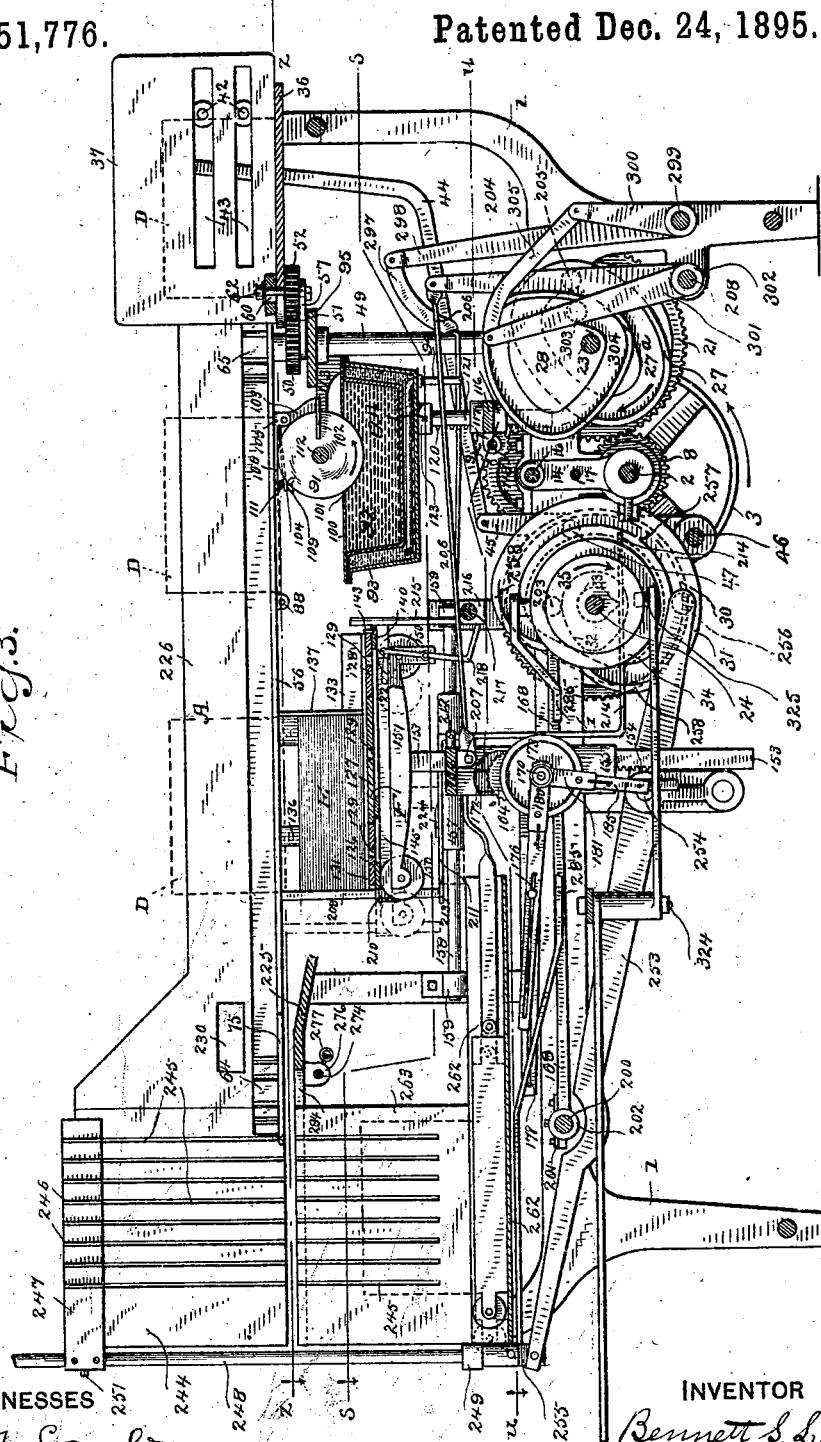

(No Model.) 11 Sheets—Sheet 6.
B. S. LEWIS.
PAMPHLET COVERING MACHINE.
No. 551,776. Patented Dec. 24, 189
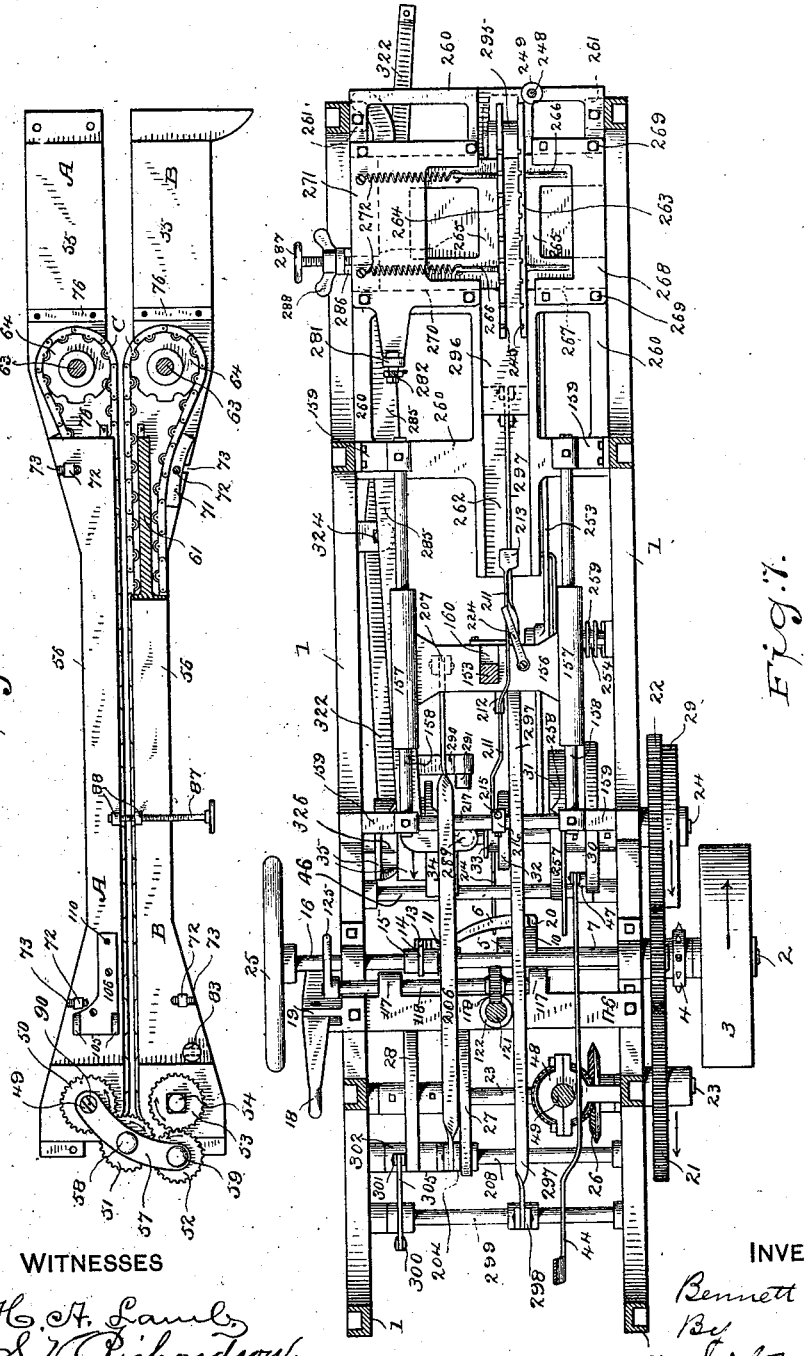
WITNESSES
H. A. Laml
S. V. Richardson.
INVENTOR
Bennett S. Lewis
By
A. M. Wooster
Atty.

(No Model.) 11 Sheets—Sheet 7.
B. S. LEWIS.
PAMPHLET COVERING MACHINE.
No. 551,776. Patented Dec. 24, 1895.
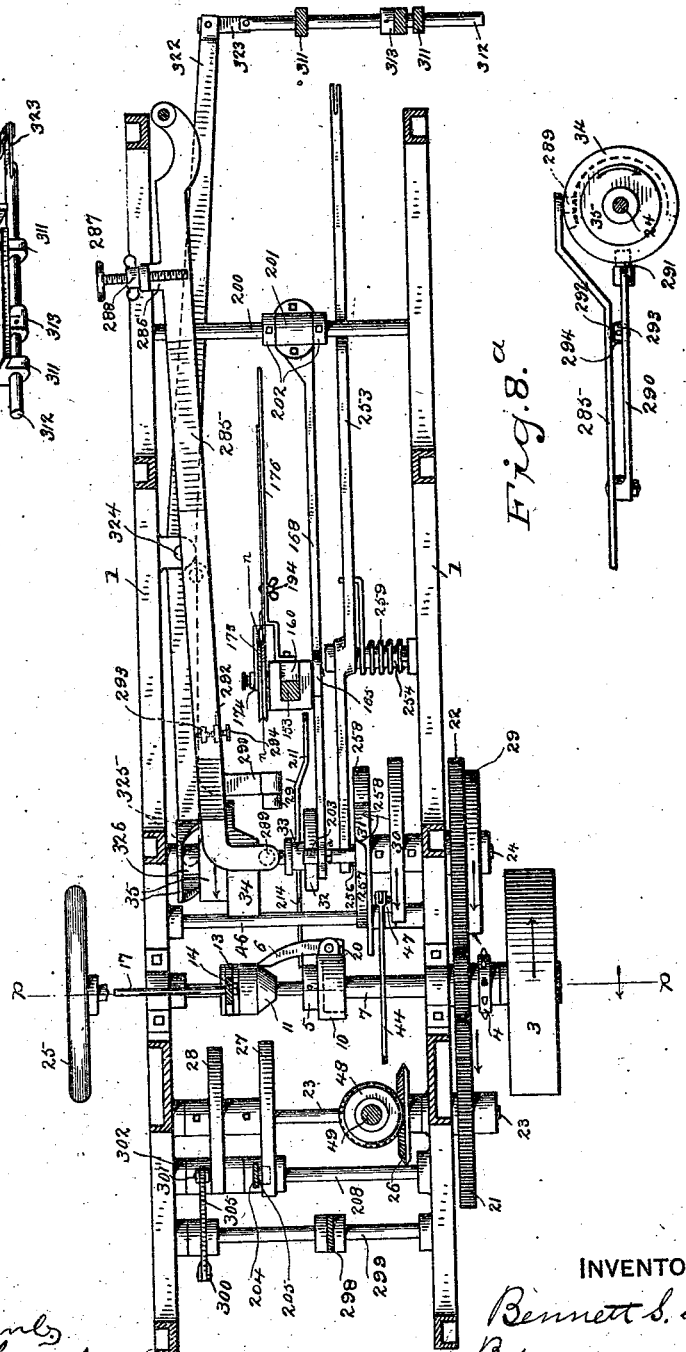
WITNESSES
INVENTOR
Bennett S. Lewis
By A. M. Wooster
Atty.

(No Model.) 11 Sheets—Sheet 8.
B. S. LEWIS.
PAMPHLET COVERING MACHINE.
No. 551,776. Patented Dec. 24, 1895.
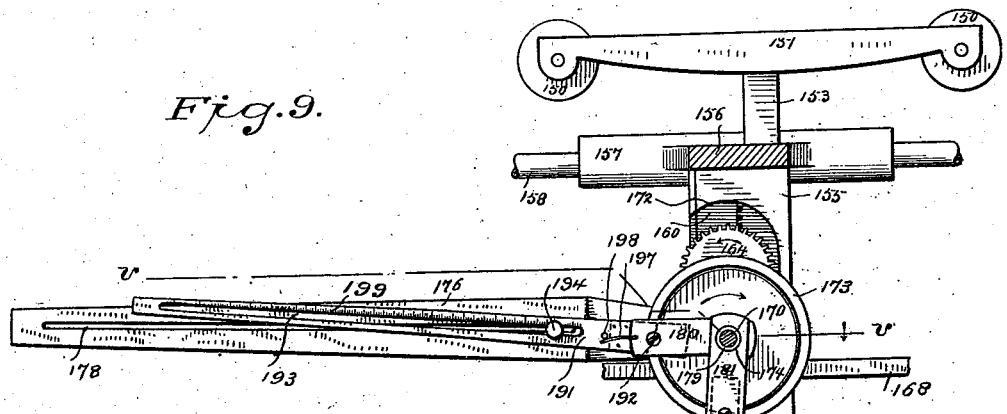
Fig. 9.
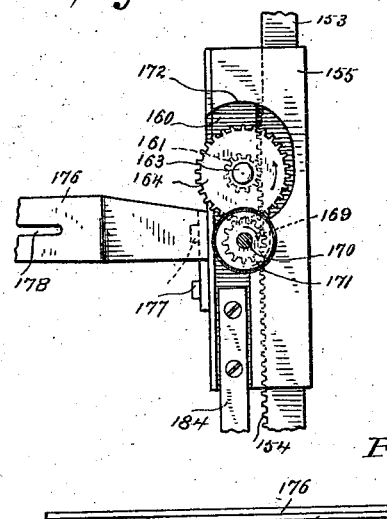
Fig. 11. Fig. 12.
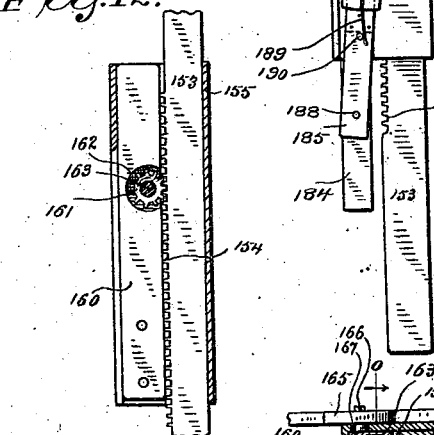
Fig. 10.
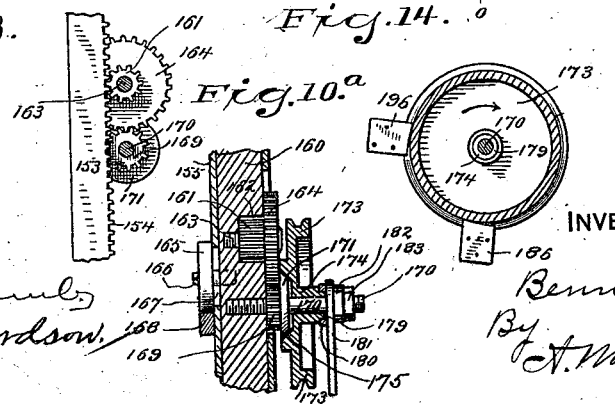
Fig. 13. Fig. 14. Fig. 10.ª
WITNESSES
H. A. Lamb
S. V. Richardson
INVENTOR
Bennett S. Lewis
By A. M. Wooster
Atty.

(No Model.) 11 Sheets—Sheet 9.

B. S. LEWIS.
PAMPHLET COVERING MACHINE.

No. 551,776. Patented Dec. 24, 1895.

WITNESSES
H. A. Lamb
S. V. Richardson

INVENTOR
Bennett S. Lewis
By A. W. Wooster
Atty.

(No Model.) 11 Sheets—Sheet 10.
B. S. LEWIS.
PAMPHLET COVERING MACHINE.

No. 551,776. Patented Dec. 24, 1895.

WITNESSES
H. A. Lamb
S. V. Richardson

INVENTOR
Bennett S. Lewis
By A. M. Wooster
Atty.

(No Model.) 11 Sheets—Sheet 11.
B. S. LEWIS.
PAMPHLET COVERING MACHINE.
No. 551,776. Patented Dec. 24, 1895.
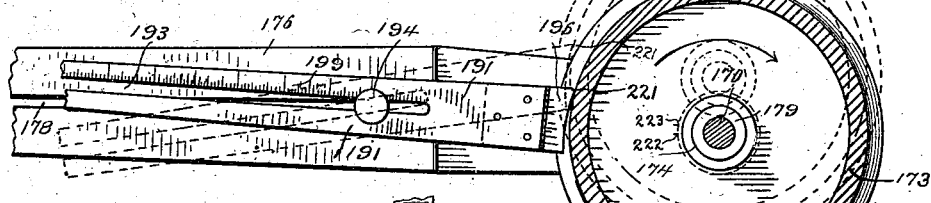
Fig. 23.
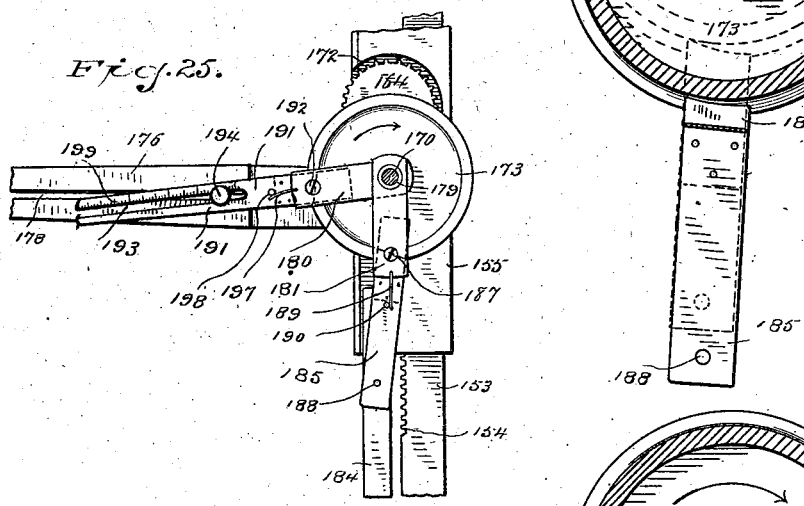
Fig. 25.
Fig. 24.
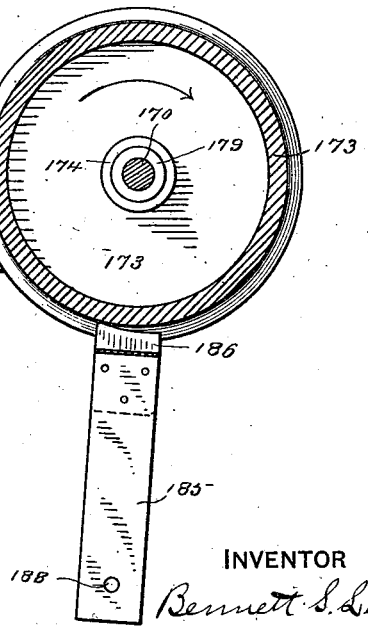
WITNESSES
H. A. Lamb
S. V. Richardson
INVENTOR
Bennett S. Lewis
By A. M. Wooster
Atty.

UNITED STATES PATENT OFFICE.

BENNETT S. LEWIS, OF NEW HAVEN, CONNECTICUT.

PAMPHLET-COVERING MACHINE.

SPECIFICATION forming part of Letters Patent No. 551,776, dated December 24, 1895.

Application filed February 23, 1895. Serial No. 539,361. (No model.)

*To all whom it may concern:*

Be it known that I, BENNETT S. LEWIS, a citizen of the United States, residing at New Haven, in the county of New Haven and State of Connecticut, have invented certain new and useful Improvements in Machines for Attaching Paper Covers to Books; and I do hereby declare the following to be a full, clear, and exact description of the invention, such as will enable others skilled in the art to which it appertains to make and use the same.

My invention has for its object to provide a machine for attaching paper covers to books which shall be capable of adjustment to adapt it to all sizes and styles of books and which shall be perfectly automatic in operation.

With these ends in view I have devised the novel machine of which the following description, in connection with the accompanying drawings, is a specification, numbers and letters being used to designate the several parts.

Figure 15:
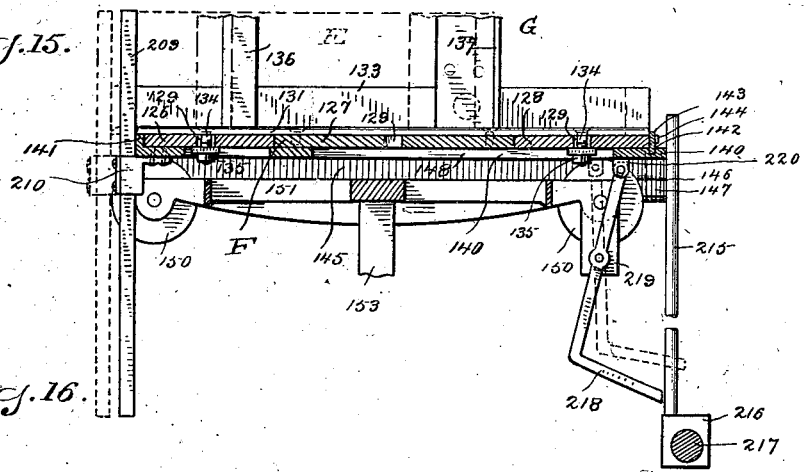
Figure 16:
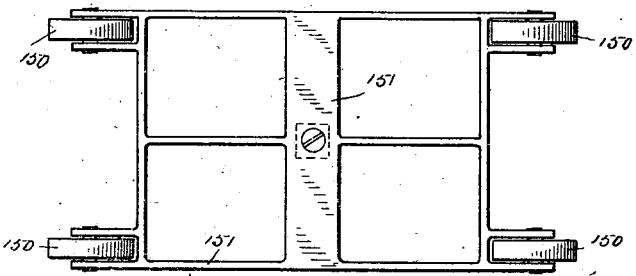
Figure 17:
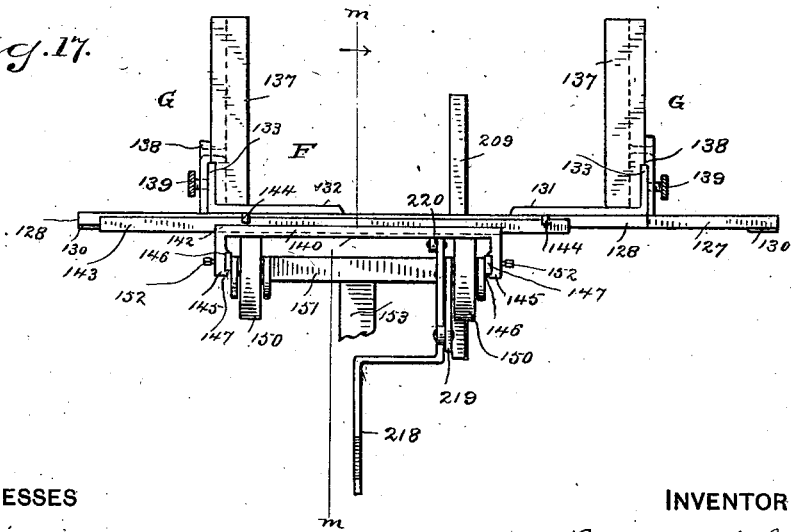
Figure 18:
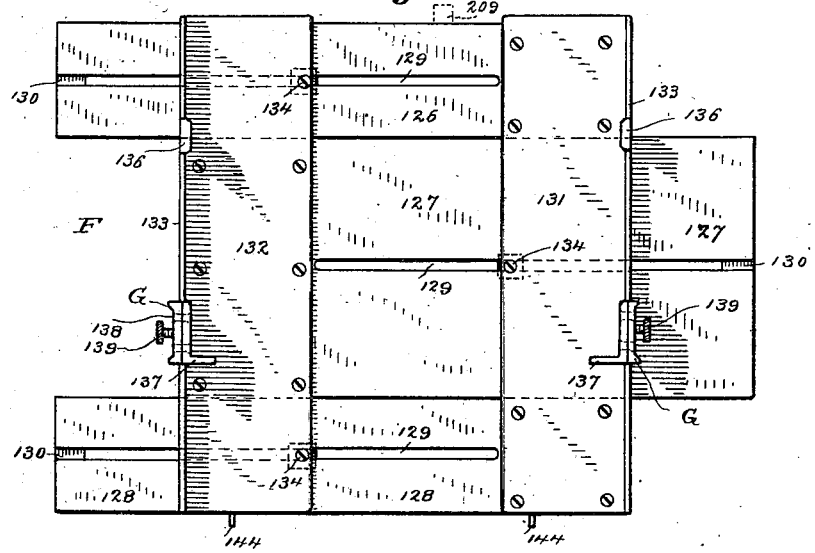
Figure 19:
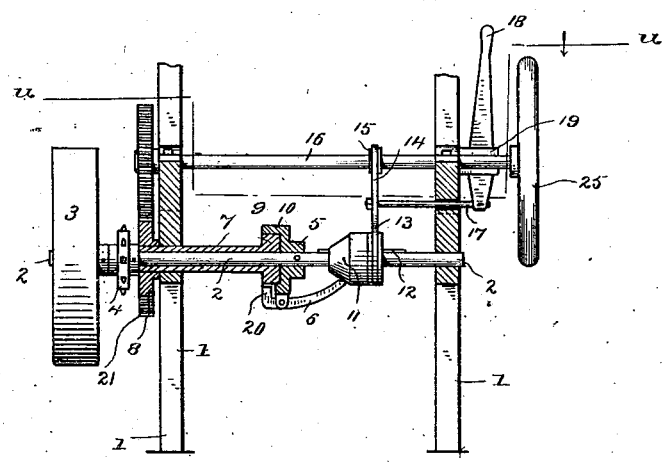

Figure 1 is a side elevation of the machine complete; Fig. 1$^a$, a detail sectional view on the line $e$ $e$ in Fig. 1; Fig. 2, a plan view; Fig. 2$^a$, a detail view illustrating the construction and operation of the pusher which removes the books from the chains; Fig. 3, a section on the line $x$ $x$ in Fig. 4, looking toward the left, the point of view being opposite to that in Fig. 1, the table being in the position at which the upward movement commences; Fig. 4, an end elevation as seen from the left in Fig. 1, the book-holder being removed; Fig. 5, a section on the line $y$ $y$ in Fig. 1, looking toward the right; Fig. 6, a plan view, the book-carrying chains and the frames therefor being removed and one of the shafts being in section, the horizontal plane of said view being at the line $z$ $z$ in Figs. 1 and 3; Fig. 7, a section on the line $s$ $s$ in Figs. 1 and 3, looking down; Fig. 8, a section on the line $u$ $u$ in Figs. 1 and 3, looking down; see also same line in Fig. 19; Fig. 8$^a$, a detail view of the cam and levers which operate the receiving-platform and the movable squeezer-plate; Fig. 8$^b$, a detail perspective illustrating the construction and operation of the pusher which moves the books forward out of the way on the receiving-table; Fig. 9, an enlarged view illustrating the mechanism for raising the cover-table, the position of the parts corresponding with Figs. 1 and 3, the table being at the lowered position and at the extreme of its movement toward the front—*i. e.*, just before the upward movement commences; Fig. 10, a section on the line $v$ $v$ in Fig. 9, looking down; Fig. 10$^a$, a section on the line $o$ $o$ in Fig. 10, looking toward the right; Fig. 11, a section on the line $w$ $w$ in Fig. 10, looking up; Fig. 12, a section on the line $r$ $r$ in Fig. 10, looking up; Fig. 13, a reverse view corresponding with Fig. 11; Fig. 14, a section on the line $n$ $n$ in Fig. 10, looking up; Fig. 15, a section on the line $m$ $m$ in Fig. 17, looking toward the right, the table being at the raised position; Fig. 16, a plan view of the frame and rollers upon which the cover-table rests; Fig. 17, an end view corresponding with Fig. 15, looking toward the left; Fig. 18, a plan view of the cover-table detached; Fig. 19, a section on the line $p$ $p$ in Fig. 8, illustrating the clutch on the main shaft which connects and disconnects the operating mechanism; Fig. 20, an inverted plan view of the book-carrying chains and the frames therefor detached. Figs. 21 and 22 are respectively an enlarged plan view and a side elevation illustrating the construction of the book-carrying chains; and Figs. 23 and 24 are sections on an enlarged scale on the line $n$ $n$ in Figs. 8 and 10, Fig. 23 showing the position of the friction wheel and shoes while the standard, frame-platform, table, &c., are moving downward, the friction-wheel being held against backward movement by one of the shoes, the other shoe being inoperative, and said figure also showing in dotted lines the position of the parts at the beginning of the downward movement so as to illustrate in connection with Figs. 9 and 25 the manner in which the standard is raised slightly relatively to the slide in the case during each downward movement, and Fig. 24 showing a position of the friction-wheel and shoes while the standard, frame, platform, table, &c., are moving upward, the shoe which held the friction-wheel against backward movement during the downward movement of the parts now slipping over the surface of the friction-wheel, but the other shoe holding the friction-wheel against backward movement; and Fig. 25 is a view showing the position of the parts when the standard, frame, platform, table, &c., have reached the extreme of the upward movement and the downward movement is about to commence, this figure in connection with Figs. 9 and 23 illustrating the manner in which the friction-wheel is caused to move forward slightly during each downward movement of the standard, frame, platform, table, &c., so that the table is held back sufficiently at each downward movement, or more correctly is raised relatively to the other parts to compensate for the thickness of the cover removed while the table was at the raised position.

It should be noted that Figs. 1 to 14, inclusive, and Figs. 16 to 22, inclusive, all show the parts in the same position—that is, a position in which the table is at the lowered position and at the extreme of its movement toward the front, the upward movement being about to commence. In Figs. 1 and 3 the lowered position of the table at the other extreme of its longitudinal movement is indicated by dotted lines. In Fig. 15 the table is shown at the extreme of its upward movement, another longitudinal movement of the table and platform wholly independent of any movement of the standard and frame being indicated by a dotted position of the parts. The position of parts in Fig. 23 is substantially the same as in Figs. 9 and 14, the space between the inoperative shoe and the friction-wheel being greatly exaggerated so as to indicate clearly the position the parts occupy during the downward movement. It should be noted furthermore that wherever the terms "rear" and "front" are used they refer respectively to the feeding end and to the delivering end of the machine. But a single operator is required to run the machine. This operator stands at the front or feeding end of the machine—that is, the left as seen in Figs. 1 and 2 and the right as seen in Fig. 3.

1 denotes framework which may be of any ordinary or preferred construction and 2 the main shaft journaled therein. Power is applied to drive the machine by a belt (not shown) running over a belt-pulley 3 which is rigidly secured to shaft 2. This shaft also has rigidly secured to it a sprocket-wheel 4 and a collar 5 in which a clutch-lever 6 is pivoted. (See Fig. 19.)

7 denotes a sleeve which is journaled on the main shaft and has rigidly secured thereto a pinion 8 and is provided with a head 9 which lies in a socket 10 in collar 5.

11 denotes a cone on shaft 2 which is secured thereto by means of a rib 12, but is free to slide longitudinally thereon. This cone is controlled by a yoke 13. The yoke partially incloses the cone in the usual manner, leaving the latter free to rotate within the arms of the yoke. This yoke has formed integral with it or rigidly secured thereto an arm 14 provided with a sleeve 15 which is free to slide on a shaft 16 above the driving-shaft.

17 denotes a link one end of which is connected to arm 14, the other being pivoted to a hand-lever 18 which is itself pivoted between lugs 19 extending from any suitable portion of the framework. (See Figs. 2 and 7.) It is obvious that movement of the cone toward the left as it appears in Fig. 19 will force the end of clutch-lever 6 that is in engagement therewith outward. It will be noticed in Fig. 19 that the other end of clutch-lever 6 extends inward, as at 20, so as to engage head 9 on sleeve 7. When the cone is moved toward the left, therefore, as it appears in Fig. 19, the clutch-lever is caused to engage head 9 with a frictional contact and communicate the motion of shaft 2 to sleeve 7. Pinion 8 on this sleeve meshes with two gears 21 and 22 carried respectively by shafts 23 and 24. (See Fig. 19 in connection with Fig. 8.) These shafts are journaled below the main portion of the framework, as indicated in Figs. 1 and 3.

25 denotes a hand-wheel on shaft 16, by which the machine may be operated should it be desired to move the parts without application of power. Shaft 23 carries a bevel-gear 26 and two cams designated respectively as 27 and 28. Cam 27 by means of intermediate connections presently to be described in full imparts longitudinal reciprocatory movement to the cover-carrying table. Cam 28, by means of intermediate connections presently to be described imparts longitudinal reciprocatory movement to the cover-setting slide which carries a roller that presses the cover against the back of the book. This cover-setting slide also serves as an ejector, as will be explained. Shaft 24 carries a series of cams designated respectively as 29, 30, 31, 32, 33, 34 and 35. These cams are numbered in regular order on the shaft as they appear in Fig. 8 without regard to the order in which their operation will be described. Cam 29 (see Figs. 1 and 2) operates a pusher which moves the book forward a short distance after it has passed the carrying-chains and into position to be operated upon by a pusher which moves the book down into position to be operated upon by the cover-setting roller and at the same time folding the cover to the sides of the book. Cam 30 operates a pusher which forces the book between the carrying-chains. Cam 31 operates the pusher which places the book in position to be operated upon by the cover-setting roller and folds the cover to the sides. Cam 32 by means of intermediate connecting mechanism presently to be described raises the cover-setting table. Cam 33 acts to raise the stop which holds the covers upon the cover-carrying table. Cam 34 operates the table which supports the book for an instant after it passes from the chains and also operates the squeezer-plate which holds the book while the cover is being set to the back of the book by the cover-setting roller, and cam 35 operates a pusher which moves the covered books out of the way after they have been ejected and presses them forward on the book-receiving table.

Turning now to Figs. 1, 2, 3, and 6, 36 denotes a table at the front of the machine upon which the books to be covered are placed, (so far as my present invention is concerned the books, which I have indicated by D, may be fed in any ordinary or preferred manner,) and 37 a vertical plate rigidly bolted to the table against which the side of the book to be immediately operated upon rests, the back of the book resting upon the table. Upon the outer side of plate 37 (see Figs. 1 and 2) are brackets 38, in which a rod 39 reciprocates. This rod carries a block 40, which is adjustably secured thereto by means of a set-screw 41 or in any suitable manner. This block carries the pusher 42, which may be a sliding plate if preferred, although in the present instance I have shown two rods which pass through slots 43 in plate 37 and act to push the books forward. The rod, block and pusher are reciprocated by means of cam 30 in connection with a rod 44, one end of which is pivoted to rod 39, the other being pivoted to a lever 45 journaled on a cross-rod 46, which extends between portions of the framework. This lever carries a roller 47, (see Fig. 8, also dotted lines, Fig. 3,) which engages a groove in the inner face of cam 30, so that each rotation of the main shaft and cam 30 will produce a forward and backward movement of the pusher and will force a book between the carrying-chains, the construction and operation of which I will now describe.

Turning now to Fig. 8 in connection with Figs. 2, 6, and 20, 48 denotes a bevel-gear carried by a vertical shaft 49 and meshing with bevel-gear 26 on shaft 23. At the upper end of shaft 49, which is made in two parts, as will presently be explained, is a pinion 50 which meshes with an idler-pinion 51, which in turn meshes with a second idler-pinion 52, the latter meshing with a pinion 53 carried by a short shaft 54. Shaft 49 passes through a cross-piece 95 of the framework, by which it is supported, and the upper ends of shafts 49 and 54 are both journaled in hubs 96, which extend above the chain-carrying frames. 97 denotes bolts which pass through washers 98 and engage the ends of the shafts, thereby retaining them in place. A denotes the fixed and B the movable chain-carrying frames. These frames each consist essentially of an upper plate 55, a lower plate 56, a web 61 by which the upper and lower plates are connected, and a vertical plate 226, the two vertical plates acting to support the sides of the books as they are carried along by the chains. The upper end of shaft 49 passes through the fixed frame in which it is journaled, and shaft 54 is journaled in and is carried by the movable frame. Idler-pinions 51 and 52 are carried by a swinging arm 57, one end of which is pivoted on shaft 49. Idler-pinion 51 is journaled on a stud 58 extending from said arm, and idler-pinion 52 is journaled on a stud 59, which extends from said arm, passes through a slot 60 in the lower plate of chain-carrying frame B and is held in position by a nut 62 which bears upon the plate. (See Fig. 2.) On the opposite end of the belt-carrying frames are studs 63, upon which are journaled sprocket-wheels 64. These studs are held in place by nuts 99, which bear upon other hubs 96, which extend above the top plates 55 of the chain-carrying frames. Shafts 49 and 54 both carry sprocket-wheels 65, one of which is clearly shown in Fig. 3, in which view the chain is removed. I have not deemed it necessary to illustrate these sprocket-wheels more in detail for the reason that they are identical with sprocket-wheels 64, except that they are fastened to and are carried by the shafts and act to drive the book-carrying chains, while sprocket-wheels 64 are idlers and merely carry the chains.

C denotes the book-carrying chains, each of which is continuous and the construction of which is shown in detail in Figs. 21 and 22. These chains consist essentially of outer links 65', the ends of which are pivoted together, as at 66, and which carry studs 67 upon which rollers 68 are journaled, and between said outer links intermediate links 69, which are separated by blocks 70, pivots 66 passing through the intermediate links and through the blocks as well as through the outer links. The intermediate links are suitably curved to receive the rollers, as clearly shown in dotted lines in Fig. 21. This construction provides a very strong chain which will not stretch to any serious extent in use. It will be understood from Figs. 2 and 6 in connection with Fig. 20 that the action of pinions 50, 51, 52, and 53 and the sprocket-wheels is to carry the chains forward in opposite directions, the movement of both chains being inward so that the inner sides of the two chains will move parallel and in the same direction.

The books, which I have indicated by D, as they are carried forward are clamped between the backs of the outer links of the two chains. The position of the books as they are carried forward will be clearly understood from Fig. 2.

When the machine is in use, the rollers travel upon the webs 61 of the chain-carrying frames, as is clearly shown in Fig. 20, in which one of the lower plates is broken away.

In order that the central portion of the chain-carrying frames may be made as narrow and consequently as light as possible, consistent with strength, and in order furthermore to take up any stretch in the chains that may occur from use, I provide adjustable plates or shoes 71, (see Fig. 20,) which are adapted to be moved inward against the backs of the chains so that in use the rollers on the outer sides of the chains—that is, the portions of the chains not in use—will also travel upon the webs, as is clearly shown in Fig. 20. Plates 71 are carried by headed studs 72, which are adapted to move in or out in slots 73 in the upper and lower plates of frames A and B, (see Figs. 1 and 20,) the studs being locked in position after adjustment by nuts 74. It will be noticed in Fig. 20, which is a plan view, that plates 56 of the chain-carrying frames are not made the full length of the chains. In practice I inclose sprocket-wheels 64 on the under side by independent plates 75, which are secured to suitable ledges 76 cast integral with the frames. This construction is simply for convenience in assembling, plates 75 being shown only in Figs. 1 and 20. One end of frame A, the right end as seen in Fig. 1, rests upon a bracket 77 upon a casting 78, to which it is rigidly bolted, (see Fig. 1 in connection with Fig. 4,) casting 78 itself being bolted to the framework. The other end of frame A rests upon table 36, to which it is likewise bolted. The right end of frame B, as seen in Fig. 2, rests in suitable ways 79, in which it may slide freely for the purpose of adjustment. 80 is a bracket extending from casting 78, which carries an adjusting-screw 81, said screw being held against longitudinal movement in the bracket and the inner end thereof engaging a stump 82 on frame B. The other end of frame B, the left as seen in Fig. 2, rests upon table 36, upon which it may slide for the purpose of adjustment. Upon the under side of this frame (see Fig. 20) is a stump 83 which is engaged by an adjusting-screw 84, similar to screw 81, (see Fig. 2,) which is itself carried by a bracket 85 extending from any suitable portion of the framework. It will be understood from Fig. 2 that stump 82, which is engaged by one of the adjusting-screws, is upon the upper plate of frame B, and that stump 83, which is engaged by the other adjusting-screw, is upon the lower plate of frame B. It will of course be understood that rotation of these adjusting-screws will move frame B toward or from frame A, this adjustment being necessary when books of a different thickness from those previously acted upon are to be covered. Both of these screws are provided with hand-wheels 86 for convenience in manipulation.

87 (see Fig. 20) is a hand-screw engaging lugs 88 on the under sides of frames A and B, said hand-screw being threaded to engage one of the lugs, but rotating freely in the other lug without engagement therewith. The object of this hand-screw is to lock the two frames to each other to prevent the possibility of the frames springing when subjected to the severe strain of use, it being understood that the books are clamped very firmly by the links of the chains and that there is of course a tendency to spring the frames outward from each other. This is wholly overcome, however, by the use of hand-screw 87, which must of course be operated when frame B is adjusted by means of screws 81 and 84.

It will be apparent from Fig. 20 in connection with Figs. 1 and 2 that the chain-carrying frames, and with them the sprocket-wheels and the driving-gears, may be readily detached from the framework. In order to provide for the convenient removal of the chain-carrying frames I make shaft 49 in two parts, which may be connected by any suitable slip-joint—as, for instance, as indicated at the left in Fig. 20, in which the lower end of the upper portion of shaft 49 is shown, said portion of the shaft being provided with a transverse groove 90, which is adapted to receive a corresponding tongue formed at the upper end of the lower portion of said shaft, said lower portion not being shown in the drawings, as the special mode in which the joint is formed is not of the essence of my invention. As the books are carried along by the chains, the backs being downward, the back of each book passes over a glue-roller 91, the under side of which lies in a glue-tank 92. This tank is provided with an outer jacket 93, the jacket being filled with water which surrounds the tank and is kept heated to a high temperature to keep the glue in liquid form by means of steam admitted through a pipe 94, and with a cover 100 having a slot 101 through which the glue-roller passes.

102 denotes wiper-plates which are adjustably secured to a plate 103, which is formed integral with or rigidly secured to a lever 104, the latter being pivoted in lugs 105 on a plate 106 rigidly secured to the under side of plate 56 of belt-carrying frame A, (see Figs. 3, 6 and 20,) the lugs appearing in Fig. 20 and the pin designated as 107 by which the lever is pivoted between the lugs appearing in Fig. 6. The free end of the other arm of the lever is slotted as at 108, (see Fig. 6,) and a thumb-screw 109 passes through this slot and engages plate 106. (See Fig. 3 in connection with Fig. 20, in which the hole engaged by the screw is shown and is designated as 110.) A spring 111 bears upon the under side of plate 106 and upon the slotted arm of the lever and acts to force the lever downward and consequently to hold the central wiper-plate away from the periphery of the glue-roller. By turning the thumb-screw in either direction as may be required the central wiper-plate may be adjusted in or out relatively to the periphery of the glue-roller. These wiper-plates simply act to prevent a large quantity of glue from being taken up by the glue-roller and communicated to the backs of the books. The glue-roller is carried by a shaft 112, which is journaled in brackets 113 extending from the frame, (see Figs. 1, 3 and 6,) and also carries a sprocket-wheel 114. Motion is communicated to the glue-roller by means of a sprocket-chain 115, which passes over sprocket-wheel 114 and over sprocket-wheel 4 on shaft 2. 116 denotes a cross-piece, (see Figs. 1, 3 and 7,) having hubs 117 in which a shaft 118 carrying a pinion 119 is journaled. This pinion engages a rack 120 on a rod 121, which is itself supported by and is adapted to be moved vertically in a boss or enlargement 122 on cross-piece 116, the boss being slotted to receive the pinion as indicated in Fig. 7. Upon the under side of the glue-tank is a boss or enlargement 123 having an opening to receive the upper end of the rod. The glue-tank is secured to the rod by a set-screw 124, (see Fig. 3,) which engages the rod. At the outer end of shaft 118 is a hand-lever 125 by which it may be oscillated. It will be seen that when the glue in the tank becomes partially used up the tank may be raised as much as may be required by a slight movement of the hand-lever, it being of course understood that the steam connection is flexible so as to permit the glue-tank to be raised and lowered whenever required.

E denotes the covers for the books which rest upon an adjustable table F. The construction of this table will be clearly understood from Fig. 18 in connection with Figs. 1, 3, 15 and 17, it being understood that the forward movement of the table, which will presently be fully explained, is toward the top of the sheet, as seen in Fig. 18, toward the right in Fig. 1, toward the left in Figs. 3 and 15 and forward from the point of view in Fig. 17. The table consists of three transverse slides designated respectively by 126, 127 and 128 each of which is provided with a slot 129 extending inward from one end, the opposite sides of the slides being connected by metal strips 130, the slides being made of either metal or wood, preferably of wood. Slides 126 and 128 are rigidly secured to a longitudinal strip 131 and slide 127 is rigidly secured to a longitudinal strip 132 which also extends over slides 126 and 128, these strips being preferably made of metal and being provided on their outer sides with flanges 133. Bolts 134 pass through strips 131 and 132 and through the slots, and the parts are locked in position by nuts 135 on the under side. (See Fig. 15, also dotted lines in Fig. 18.)

136 denotes fixed supports against which the sides of the pile of covers rest and G longitudinally-adjustable supports against which the sides and rear end of the pile of covers rest. These adjustable supports consist of angle-pieces 137 which lie upon the inner sides of flanges 133 and plates 138 which are made integral with the angle-piece or are rigidly secured thereto and lie on the outer sides of the flanges, the supports as a whole being clamped to the flanges by set-screws 139. It will be readily understood therefore that any desired adjustment of the table to accommodate different lengths of covers may be obtained by loosening the set-screws and moving the supports G forward or backward as may be required and that adjustment to any required width of covers may be obtained by loosening nuts 135 and moving slides 126 and 128 in one direction and slide 127 in the opposite direction. This table rests upon a platform 140 from which it may be readily detached. The front end of the platform (see Fig. 15) is provided with a flange 141 against which the table rests and by which the latter is held against forward movement. At the rear end of the platform is a groove 142 which receives a locking-strip 143. (See Figs. 1, 15 and 17.) This platform may or may not be solid. In the drawings (see Fig. 6 in connection with Fig. 15) I have shown the platform as consisting of side and end strips denoted by 148 and one cross-piece denoted by 149. The special construction of the platform is however wholly immaterial.

144 denotes pins which extend from the side of slide 128 and are adapted to engage notches in the locking-strip, thereby securing the table to the strip, the latter being held in position by the groove 142 which receives it. Upon the under side of the platform are depending flanges 145 which are provided in their inner faces with grooves 146 which receive gibs 147. This platform rests upon rollers 150 journaled in a frame 151. (See Fig. 16.) The side strips of the platform rest upon these rollers and gibs 147 bear against the sides of the frame, (see Figs. 1 and 17,) thereby retaining the platform against any except longitudinal movement on the rollers. The gibs may be moved inward to take up lost motion by means of gib-screws 152. The longitudinal movement of the table and platform on rollers 150 is wholly independent of the longitudinal movements of said parts with cross-piece 156, and is for the purpose of providing sufficient freedom of movement for the table to compensate for any slight difference in the timing of the parts of the machine or slight variations in the position in which the books may be grasped and held by the chains, all of which will be again referred to. Frame 151 rests upon and is rigidly secured to a vertically-movable standard 153 which is provided with a rack 154. This standard passes through a case 155 which depends from a cross-piece 156 itself carried by slides 157 which move on guide-rods 158, the latter being supported by brackets 159 extending from the framework. (See Figs. 6 and 7 in connection with Figs. 9 to 14 inclusive.) Within the case and lying close to the standard is a slide 160.

161 denotes a pinion which lies in a recess 162 in slide 160 and is journaled on a stud 163 carried by said slide.

164 denotes a gear-wheel which is made integral with or rigidly secured to pinion 161 and of course turns with it on the stud. Pinion 161 engages rack 154 on the standard and is the only connection between slide 160 and the standard.

165 denotes a roller journaled on a stud 166 which extends outward from the slide, passing through a slot 167 in the side of the case. (See Fig. 10ª.) This roller rests upon a lever 168 which is raised at regular intervals, thereby raising slide 160 and the standard, table, &c., as will presently be fully explained, it being immaterial so far as the operation of the parts illustrated in Figs. 9 to 14, inclusive, is concerned how the upward movement is imparted to this slide. The weight of the parts resting upon lever 168 produces the downward movement as soon as the lever drops down.

169 (see Fig. 10ª) denotes a pinion journaled on a stud 170 which extends outward from slide 160. This pinion meshes with gear-wheel 164 and has formed integral therewith or rigidly secured thereto a beveled friction-disk 171, the side of the case being cut away as at 172, (see Figs. 10ª and 11,) so as to permit the gear-wheel and pinion to move up or down freely with the slide.

173 denotes a friction-wheel, the hub 174 of which is also journaled on stud 170. The inner face of this friction-wheel is provided with a beveled recess 175, the shape of which corresponds with friction-disk 171 so that when said friction-wheel and friction-disk are locked together, as will presently be described, rotary movement imparted to the friction-wheel will be communicated to pinion 169, meshing with gear-wheel 164, which in turn carries pinion 161 engaging the rack on the standard. It will be seen therefore that rotary movement imparted to the friction-wheel acts through the connections just described to raise the standard and with it the cover-carrying table, the purpose of which will presently be fully explained, this movement of the standard being independent of the movement produced by lever 168.

176 (see Figs. 3, 9, 10, 23, 24 and 25), denotes an arm which is rigidly secured to the case and extends forward therefrom. In Fig. 10 this arm is shown as secured to the case by bolts 177. This arm is provided with a slot 178, the purpose of which will presently be apparent. The outer end of hub 174 is reduced as at 179, (see Figs. 10 and 10ª,) and carries arms 180 and 181, which are adapted to oscillate thereon. These arms are retained in position on the hub by a nut 182 engaging a thread at the outer end of the reduced portion.

183 denotes a nut engaging the threaded outer end of stud 170, and bearing against the hub to press the latter inward, thereby forcing the wall of the beveled recess in the friction-wheel against friction-disk 171, which locks the parts together so that rotary movement imparted to the friction-disk will, through the pinions and gear-wheel just described, impart a vertical movement to the standard and cover-carrying table wholly independent of the vertical movement of the standard imparted by lever 168. As will presently be fully explained this independent upward movement of the standard is a movement relative to slide 160 and takes place during the downward movement of the table, platform, frame and standard, the object being to raise the table slightly higher at each upward movement so as to compensate for the thickness of the cover removed therefrom at the last upward movement, and the purpose of the simple connection between the friction-wheel and the disk just described is to provide convenient means for lowering the standard and cover-carrying table when a new lot of covers is placed upon the table without removal of parts from the machine or any disturbance of the adjustments, all of which will be again referred to.

184 denotes an arm extending downward from the case at right angles to arm 176.

185 denotes a link the ends of which are pivoted respectively to arms 181 and 184, (see Fig. 9,) and which carries a shoe 186 which is adapted to engage the periphery of the friction-wheel. (See Fig. 14 in connection with Figs. 23, 24 and 25.)

187 denotes the pivotal point of the link to arm 181, and 188 denotes the pivotal point of the link to arm 184. A spring 189 extends from the lower end of arm 181 and bears against a pin 190 extending outward from the link, the action of this spring being to hold the shoe in engagement with the periphery of the friction-wheel.

191 denotes a link one end of which is pivoted to arm 180, as at 192, the other end extending outward and being provided with a slot 193, any portion of which is adapted to register with slot 178 in arm 176. 194 denotes a bolt adapted to pass through these slots and provided with a thumb-nut 195 by which the link and the arm are locked together, the bolt constituting a pivot on which the link oscillates at each upward and downward movement of slide 160, the standard, table, &c.

196 denotes a shoe which is carried by link 191 and is adapted to engage the periphery of the friction-wheel. (See Figs. 10 and 14 in connection with Figs. 23, 24 and 25.)

197 denotes a spring extending outward from arm 180, the free end of which bears against a pin 198 extending outward from the link, the action of this spring being to hold the shoe in engagement with the periphery of the friction-wheel, as will presently be fully explained.

199 indicates a scale on link 191 for the guidance of the operator in making fine adjustments of the pivotal point of link 191 to arm 176, it being obvious that if the pivotal point—i. e., bolt 194—is moved toward the right the oscillation of the link at each upward and downward movement of slide 160, the standard, table, &c., will be lessened, and if said pivotal point is moved toward the left the oscillation of said link at each upward and downward movement of slide 160, the standard, table, &c., will be increased, the friction-wheel will have a slightly-increased forward movement imparted to it, and the standard, table, &c., will be raised a little more at each movement as would be necessary in changing from thinner to thicker covers. As already stated, the upward and downward movements of slide 160, the standard, table, &c., are produced by movements of lever 168, which is engaged by roller 165, carried by slide 160 in the case. The inner end of this lever is pivoted on a cross-piece 200, (see Figs. 3 and 8,) extending transversely from side to side of the framework; 201 denoting the cap-piece of the bearing and 202 collars by which the lever is held against lateral displacement on the cross-piece. The free end of this lever carries a roller 203 which engages the periphery of cam 32 on shaft 24. The shape of this cam is clearly shown in Fig. 3, in which it appears in dotted lines. It will be understood that each rotation of this cam produces an oscillation of lever 168 and an even upward and downward movement of slide 160, the standard, table, &c., and that during more than one-half of the rotation the lever and parts operating in connection therewith will be stationary at their normal—i. e., the lowered position. In connection with this movement it is necessary to consider the mechanism for imparting longitudinal reciprocatory movement to the table. This movement is produced by cam 27 on shaft 23 in connection with a lever 204 carrying a roller 205, which engages a groove $27^a$ in said cam and a rod 206, one end of which is pivoted to the free end of lever 204, and the other to the under side of cross-piece 156, as at 207. (See Fig. 3 in connection with Figs. 7 and 8.) The lower end of lever 204 is pivoted on a cross-piece 208, which extends across from side to side of the framework. It will be obvious that each rotation of cam 27 will produce a forward and backward movement of cross-piece 156 and the case, standard, table, &c., which are carried thereby. In order to insure, however, that the top cover—i. e., the one that has been attached to the back of the book between the chains—shall not adhere to the cover below it, I lay out groove $27^a$ in cam 27 in such a manner that it will impart to cross-piece 156, the standard, table, &c., an accelerated movement which commences an instant after the top cover has become attached to the back of the book. By accelerated movement I mean that the cover-carrying table moves forward faster than the book that is being carried by the chains. Simultaneously with the acceleration of the forward movement of cross-piece 156, the standard, table, &c., the standard and table commence to move downward, so that the actual movement of the table and the pile of covers thereon is an oblique downward movement, which is faster than the forward movement of the book that is being carried by the chains. The pile of covers is thus dragged forward and downward away from the cover which has become attached to the book between the chains while at the same time angle-pieces 137 will press the attached cover forward, causing it to crinkle slightly, so that all danger of a second cover adhering to the one attached to the book is wholly prevented.

Turning now to Fig. 15 in connection with Figs. 1 and 3, 209 denotes a stop against which the end of the book strikes as it is carried forward by the chains. This stop is held by friction only in a guide 210, which is rigidly secured to the platform. It will be obvious that as the standard, platform, table, &c., are moved upward the stop will be moved upward with them until it comes in contact with lower plate 56 of chain-carrying frame A. As the platform will continue to rise until the top cover of the pile upon the table is raised high enough so that it will adhere to the back of a book between the chains, it follows that the stop will be pressed downward in the guide until it is level with the top of the pile of covers, in which position it will move downward with the standard, platform, table, &c., after the top cover has become attached to the book. Just before the next upward movement of the platform, table, &c., takes place and while the table is at the extreme of its movement toward the front—i. e., the left as the machine is seen in Figs. 1, 2, 7 and 8—the stop is moved upward sufficient distance so that its upper end will be higher than the top of the pile of covers and in position to be engaged by the front end of the next book as it is carried along by the chains. This upward movement of the stop is produced by cam 33 on shaft 24 in connection with a lever 211. This lever, the shape of which is clearly shown in Fig. 3, is practically a bell-crank lever and is pivoted in a yoke 212, which extends toward the front from cross-piece 156. (See Fig. 7 in connection with Figs. 1 and 3.) The forward end of the horizontal arm of this lever is widened, as at 213, for engagement with the lower end of the stop, and the lower end of the vertical arm of said lever is provided with an extension 214, which is adapted to be engaged by cam 33, as clearly shown in Fig. 3, this extension being made sufficiently long to permit the longitudinal movement of the lever with cross-piece 156 without danger of the extension passing off from the cam.

224 (see Figs. 3 and 7) denotes a spring, one end of which is attached to cross-piece 156 and the free end of which presses upon the top of lever 211, acting to press the upper—i. e., the horizontal—arm of said lever downward and to hold extension 214 upward in contact with cam 33, so that when the operative portion of said cam comes in contact with the extension it will tilt the lever and raise the stop, the spring returning the lever to its normal position as soon as the operative portion of the cam passes it, the lever being shown as tilted and in the act of raising the stop in Fig. 3. In Figs. 1 and 3 the position of the parts is at the moment the stop has been raised by the engagement of the cam with the extension 214 of lever 211, just before the upward movement of the standard, table, &c., takes place, and the position in Fig. 15 is at the moment the table has been raised to its highest position, at which instant the top cover thereon will engage the back of a book between the chains, the pile of covers being designated by the letter E and appearing in full lines in Figs. 1 and 3 and indicated by dotted lines in Fig. 15.

215 denotes a stop which is adapted to be engaged by the platform (see Figs. 1, 3 and 15) to limit the backward movement of the platform and table—i. e., the movement toward the front. This stop extends upward from a block 216 which is carried by a cross-piece 217 extending transversely from side to side of the framework and serving as a brace-rod for the framework in addition to being a support for the block.

218 (see Figs. 15 and 17) denotes a lever which is pivoted to an arm 219 extending downward from frame 151. One arm of this lever is pivoted to a yoke 220 on the underside of platform 140, the pivot of this lever to the yoke lying in a slot, so as to permit oscillation of the lever. This slotted connection is indicated in Fig. 15, but is not shown in detail, as it is an obvious mechanical expedient. The free arm of this lever is bent inward at an angle, then downward, and then backward, as is clearly shown in Fig. 17 in connection with Fig. 15, into position to engage block 216 when the table moves backward after having been moved upward, forward and downward. The action of this lever is to move the platform and table from any position relatively to frame 151 to which they may have been carried by the forward movement of a book carried by the chains before the downward movement takes place (leaving the top cover in engagement with the back of the book) back to their normal position and before the next upward movement takes place. This possible forward movement of the table and platform relatively to the frame is indicated by a dotted position of the parts in Fig. 15, the normal position of the frame and platform relatively to frame 151 being shown in full lines in said figure.

I will now describe the operation of the entire cover-carrying mechanism. As has already been stated, the books are fed to the chains by pusher 42, which is of course timed with the other parts of the machine. It will furthermore be understood from the description of the cover-carrying mechanism that the table has four movements—that is to say, an upward movement, then a forward movement, then an oblique downward movement, and then a backward movement to the starting-point. In Figs. 1 and 3 the table is shown at what I have termed the "starting-point"— that is, at the backward position (i. e., toward the front)—and ready to rise. The parts are so timed that the book is passing over the table while the latter is rising. The forward end of the book first comes in contact with sliding stop 209, which has already been raised through the action of lever 211 and cam 33. This engagement of the book with the stop centers the book relatively to the cover that is to be attached to it, the stop, as already stated, having been moved above the top of the pile of covers, but being pushed down to the level of the top of the pile of covers by engagement with lower plate 56 of chain-carrying frame A as the table rises, so that when the top cover comes in contact with the back of the book the stop will not extend above the top of the pile of covers, and will not interfere with the removal of the top cover from the pile by the book to which it has been attached. At the instant the top cover comes in contact with the back of the book between the chains the forward movement of the table will commence through the action of cam 27, lever 204 and rod 206, which is pivoted to cross-piece 156. The table now moves forward with the book between the chains. This movement, which takes but an instant, permits the cover to become firmly attached to the back of the book, which has previously passed over the surface of a glue-roller, as has already been fully explained. An instant later the oblique downward movement of the table with the pile of covers thereon takes place, angle-pieces 137 causing the attached cover to crinkle slightly, as already explained, so that the top cover is separated from the others, and all danger of the adhesion of a second cover to the attached cover is prevented. In order to provide for a possible variation of the parts, owing to the manner in which the book may be grasped by the chains or from any cause whatever, I provide for a forward movement of the table and the pile of covers thereon independently of the forward movement of cross-piece 156, the standard and frame 151. This movement results from the table, and the platform to which it is attached, resting upon rollers 150 on frame 151. This independent movement of the table and platform relatively to the frame may or may not take place. Suppose, however, that cross-piece 156, the standard and the frame are slightly behind the book in the forward movement. Any slight difference in timing or any slight variation from normal in the position of the book that may exist at this moment is fully compensated for by the freedom of the table and platform to move forward with the book and chains independently of cross-piece 156, the standard and frame 151. This slight movement of the table and platform relatively to the frame will be clearly understood from Fig. 15, in which a forward position of the table and platform relatively to the frame is indicated by dotted lines. The position of the standard, frame, platform and table at the end of the oblique downward movement is indicated by dotted lines in Figs. 1 and 3. The instant the oblique downward movement of the table ceases the backward movement takes place through the action of cam 27, lever 204 and rod 206, as already fully described. An instant later stop 209 is raised through the action of cam 33 and lever 211. The parts are now in position for the next upward movement of the standard, frame, platform and table, which is produced through lever 168, the latter being oscillated by cam 32. This lever is engaged by the roller 165 carried by slide 160 in case 155. The slide also carries a pinion 161, which engages a rack on the standard, this being the only connection between the slide and the standard. Pinion 161 has formed integral with it, or rigidly secured thereto, a gear-wheel 164, which meshes with a pinion 169 journaled on stud 170, which also carries a friction-disk 171 made integral with or rigidly secured to said pinion. Friction-wheel 173 is also journaled on said stud and is locked to this friction-disk, so as to turn with it. As the friction-wheel is at all times locked against backward movement, either by shoe 186 or by shoe 196, it follows that each upward movement of slide 160 will carry the standard, frame, platform and table with it through the engagement of pinion 161 on slide 160 with the rack on the standard. In Fig. 24 I have illustrated a position of shoes 186 and 196 during the upward movement, the space between shoe 196 and the periphery of the friction-wheel being greatly exaggerated, so as to show clearly that shoe 196 does not hold during the upward movement, the holding of the friction-wheel against backward movement during the upward movement of the slide, standard and parts carried thereby being wholly performed by shoe 186, link 191, which carries shoe 196, being free to oscillate on bolt 194, which serves as its pivot. Fig. 9 shows the position of the parts at the moment the upward movement commences, and Fig. 25 shows the position of the parts at the end of the upward movement, link 191 shifting during the upward movement from the position shown in Fig. 9 to that shown in Fig. 25. The parts remain in the position shown in Fig. 25 during the forward movement of cross-piece 156, the case, standard, frame, platform and table, and are consequently in this position when the downward movement commences, the parts shifting during the downward movement from the position shown in Fig. 25 back to that shown in Fig. 9, Fig. 23 showing the position of the shoes while this movement is taking place. The normal action of springs 189 and 197 is to hold shoes 186 and 196 respectively in contact with the periphery of the friction-wheel. The relative position of arms 180 and 181 and links 185 and 191 is greatly exaggerated in Figs. 9 and 25. This exaggeration is for the purpose of making the action of the parts clear. As a matter of fact the springs merely act to hold the shoes in contact with the periphery of the friction-wheel; but the locking action is automatic, as will be apparent, with relation to shoe 186 from Fig. 24 and with relation to shoe 196 from Fig. 23. It will be seen from Fig. 24 that the engaging-point of shoe 186 is beyond the point of intersection with the periphery of the friction-wheel of a line passing through the centers of stud 170 and pivotal point 188 of link 185, which carries the shoe, and from Fig. 23 that the engaging-point of shoe 196 is beyond the point of intersection with the periphery of the friction-wheel of a line passing through the centers of stud 170 and bolt 194, forming the pivot of link 191, which carries the shoe. During the upward movement therefore the pivotal point 194 of link 191 being stationary and the friction-wheel moving upward it follows that the locking action of shoe 196 will be relieved, and it is clearly apparent that any tendency of the friction-wheel toward backward movement will be locked by shoe 186, spring 189 acting at all times to hold said shoe in contact with the periphery of the friction-wheel, and any tendency toward backward movement of the friction-wheel causing said shoe to act automatically to check the movement. When the downward movement takes place, however, the conditions change. The position of the parts at the instant the downward movement commences is clearly shown in Fig. 25 and by dotted lines in Fig. 23. The instant that the downward movement commences any tendency toward backward movement of the friction-wheel will be automatically checked by shoe 196, said shoe being, as already stated, retained in contact with the periphery of the friction-wheel by spring 197, it having been deemed best, as already stated in Figs. 23 and 24, to indicate a clear space between shoes 186 and 196 respectively and the friction-wheel in order to make clear the operation of the parts. It will be understood furthermore, owing to the fact that the engaging-point of shoe 196 with the periphery of the friction-wheel is beyond the point of intersection with the periphery of the friction-wheel of a line passing through the centers of stud 170 and bolt 194, that in order to permit the parts to change from the position shown in Fig. 25 and in dotted lines in Fig. 23 to the position shown in Fig. 9 and substantially that in full lines in Fig. 23 it will be necessary for the friction-wheel to turn slightly on stud 170, on which it is journaled. This movement will be readily understood from Fig. 23, the position in dotted lines being the position at the beginning of the downward movement and the position in full lines being the position at the end of the downward movement. It should furthermore be borne in mind that the bolt 194, which serves as a pivot for link 191 carrying shoe 196, is fixed and neither moves up nor down. Now as the engaging portion of shoe 196 holds the friction-wheel at a certain point in its periphery, which I have indicated by 221, and as it is impossible for this point to slip under the shoe it follows that unless the friction-wheel turns forward on its axis the downward movement would be blocked. Owing to the fact, however, that the friction-wheel can turn forward on its axis the downward movement takes place freely, but during the downward movement sufficient rotation of the friction-wheel on its axis must take place to permit said friction-wheel to move from the position shown in dotted lines in Fig. 23 to the position shown in full lines in said figure. Turning now to Fig. 10$^a$, it will be seen that this movement of the friction-wheel will carry pinion 169 meshing with gear-wheel 164, and, the latter being fixed to pinion 161 which engages the rack, that the rack must receive a slight upward movement. The forward movement of pinion 169 is indicated approximately in Fig. 23, in which a certain arbitrary place in the periphery of said pinion at the beginning of the downward movement is indicated by 222, and the same point in the periphery of said pinion at the end of the downward movement is indicated by 223. It has already been stated and will be clearly understood from Fig. 23 that shoe 186 will not act to hold the friction-wheel against forward movement, but only against backward movement, so that during the downward movement there is no check upon the carrying forward of the friction-wheel by the engagement with the periphery thereof of shoe 196. This forward movement of the friction-wheel and slight upward movement of the standard, frame, platform and table is to compensate at each upward movement of these parts for the thickness of the cover removed from the table at the last previous upward movement. Suppose, for example, that the covers are each one one-hundredth of an inch in thickness. The pivotal point of link 191 to arm 176 will be so adjusted as to impart sufficient movement to pinion 161 to carry the standard, frame, platform, table, &c., upward one one-hundredth of an inch during each downward movement of the standard, table, &c. In order that this movement may be regulated to the minutest fraction of an inch I provide a scale 199 on link 191, which is graduated to minute fractions of an inch, so that bolt 194, which is the pivot on which the link oscillates, may be set at any adjustment necessary to produce the required upward movement of the standard, table, &c., relatively to slide 160 while said parts are moving downward. It will be apparent that by loosening thumb-screw 195 and moving bolt 194 toward the left as the parts are seen in Figs. 9, 10, 23, 24 and 25 the oscillation of the link at each upward and downward movement of the standard, table, &c., will be increased, and consequently an increased forward movement will be imparted to the friction-wheel, and through the gear-wheels and pinions an increased upward movement relatively to slide 160 will be imparted to the standard, frame, platform, and table during each downward movement of said parts, and that when said bolt 194 is moved toward the right as seen in Figs. 9, 10, 23, 24 and 25 the oscillation of said lever will be lessened during each upward and downward movement, and consequently that the upward movement of the standard, frame, platform and table relatively to slide 160 will also be lessened. This is owing to the fact that when bolt 194, which is the pivot on which link 191 oscillates, is moved toward the left engaging-point 221 of shoe 196 on the friction-wheel moves in an arc of a greater circle than when it is moved toward the right. When the bolt is moved toward the left, therefore, the engaging-point has a slightly longer contact with the friction-wheel, and consequently imparts slightly-increased movement to the friction-wheel. When the bolt is moved toward the right the effect is just the reverse, and less movement is imparted to the friction-wheel. Suppose now that the machine commences to work with a pile of covers upon the table six inches high. It will be apparent, in view of the fact that the table descends a slightly-decreased distance at each downward movement, that when the pile of covers shall be exhausted the lowered position of the table will be six inches higher than the lowered position of the table when work was commenced upon that special pile of covers, and consequently that it will be necessary to lower the table, platform, frame and standard relatively to slide 160 before a new pile of covers can be placed on the table. This is accomplished by loosening nut 183 at the outer end of stud 170, which relieves the engagement of the wall of the beveled recess in the friction-wheel with friction-disk 171. This permits pinions 161 and 169 and gear-wheel 164 to be rotated backward without carrying the friction-wheel. Having loosened nut 183, as already stated, the operator presses down the table, platform, frame and standard in the case as far as may be required, it being understood of course that as the standard is pressed down the rack will engage pinion 161 and will rotate said pinion, gear-wheel 164 and pinion 169, but wholly independently of the friction-wheel, which is held at all times by shoes 186 and 196. The distance the table is required to be moved down depends of course upon the height of the pile of covers that is to be operated upon, it being of course necessary to so adjust the table in starting that at the raised position the top cover will engage the back of a book that is being carried along by the chains. Having placed the table at the desired adjustment it is locked there by tightening up nut 183, and the machine is ready for operation as before.

225 denotes a table supported by any suitable portion of the framework of the machine, (see Figs. 1 and 3,) over which the back of the book passes as it is carried along by the chains and over which the attached cover passes. This table retains the cover in a horizontal position—that is, it prevents the sides of the cover from dropping down away from the back of the book. The rear end of the table is inclined downward, as clearly shown, so as to prevent any possibility of the cover catching upon the rear end of the table and being torn off or crumpled as it is carried forward by the chains.

227 denotes a pusher carried by a slide 228, which moves in guides 229 attached to the vertical plate 226 on chain-carrying frame A. (See Figs. 2 and 2ª.) The pusher is pivoted in a slot at the forward end of the slide, and the forward end of the pusher extends inward obliquely and passes through slots 230 in plates 226, (see Figs. 1 and 3,) in which the slot in the plate 226 forming part of frame A is clearly shown. A spring 231 acts upon the pusher to retain it in its normal position, the inward movement of the pusher being checked by a wall of metal 232, (see Fig. 2ª,) which serves as a stop. As the book is carried along by the chains, the cover lying out flat and resting upon table 225, the front end of the book will come in contact with pusher 227 and will move it backward out of the way against the power of the spring, as indicated by dotted lines in Fig. 2ª. As soon as the book has passed the pusher the spring will return the latter to its normal position, as indicated in full lines, the front end of the pusher at this instant lying just back of the book. The machine is so timed that the instant pusher 227 has been moved into position back of the book the slide carrying the pusher with it will begin to move forward, and as soon as the book is released by the chains it will be moved forward away from the chains by the pusher until the back of the book rests upon a platform 233, (see Figs. 4, 5 and 6,) in which the position of the platform at the instant it receives the book is shown in dotted lines and its retracted position is shown in full lines, the cover at this time lying out flat on table 225. Slide 228 receives longitudinal reciprocatory movement through cam 29. This cam is provided in its face with a groove 234, which receives a roller 235, carried by an arm 236, which extends downward from a rock-shaft 237 journaled in a bearing 238 supported by any suitable portion of the framework. From the inner end of this rock-shaft an arm 239 extends upward.

240 denotes a link, one end of which is pivoted to arm 239 and the other to slide 228. It will be apparent that each rotation of the cam will produce a forward and backward movement of the slide and pusher 227.

241 denotes plates adapted to slide in ways 242 formed upon the upper plates 55 of chain-carrying frames A and B. These plates are adapted to be moved in or out in changing the machine to accommodate thinner and thicker books and are locked to the chain-carrying frames after adjustment by bolts 243, which pass through slots in plates 241 and engage plates 55.

Each of the plates 241 carries a vertical plate 244, which extends upward therefrom at right angles and also extends toward the front and rear ends of the machine, as will be clearly understood from Fig. 2 in connection with Fig. 1, the ends of plates 244 toward the front of the machine extending up to the forward ends of plates 226, but having no connection therewith. Plates 244 are provided on their inner faces with vertical grooves 245, which receive the wings 246 of a vertically-moving pusher 247, which acts to move the books downward between other plates presently to be described, which set the covers to the sides of the books and into position to be operated upon by the cover-setting roller.

This pusher is carried by a rod 248 supported in guides 249, one of which is cast integral with or rigidly secured to the lower portion of the frame, the other being cast integral with or rigidly secured to end casting 78. (See Fig. 4.) The pusher is rigidly secured to a collar 250, which is itself secured to rod 248 by a set-screw 251. (See Figs. 3, 4 and 5.) The wings upon the pusher engage the front edge of the book and act to push it down, the width of the book being compensated for by adjustment of the pusher on the rod and the adjustment to different thicknesses of books being compensated for by loosening bolts 243, which pass through slots in the plates 241 which carry the vertical plates 244 and tightening them again after adjustment of the plates. The rod carrying the pusher with it is reciprocated by means of a lever 253, which is pivoted on a stud 254 extending from any suitable portion of the framework, (see Fig. 8,) the free end of said lever being pivoted to a link 255, which is itself pivoted to the lower end of the rod, as clearly shown in Figs. 1, 3 and 4. At the rear end of lever 253 is a roller 256, (see dotted lines in Fig. 3,) which is held by the weight of the rod, pusher, &c., in engagement with a wall 257 on cam 31, (see Figs. 3 and 8,) said cam being provided on one side with a flange 258 which acts at a certain portion of each revolution of the cam to raise the rear end of lever 253, and consequently to lower the forward end thereof, thereby drawing down the rod and pusher. A spring 259 (see Fig. 8) acts to partially overcome the weight of the rod and pusher, so as to partially relieve the strain upon the cam. It will be readily understood that each rotation of said cam will produce an upward and downward movement of the rod and pusher.

I have for the sake of clearness described the operation of the pusher before describing the operation of platform 233. It will of course be understood, however, that before the book can be moved down by pusher 247 platform 233 must have been moved out of the way. This movement I will now describe in connection with another movement which is produced by the same mechanism.

260 (see Figs. 4, 5 and 7) denotes a plate which is rigidly secured to the opposite sides of the framework, said plate resting upon ledges 261 which are cast upon the framework. This plate has cast in it a trough 262, the purpose of which will presently be explained.

263 denotes a fixed squeezer-plate and 264 a movable squeezer-plate. These plates have formed integral with them angle-plates 265 which rest upon plate 260, webs 266 being formed between the angle-plates and the squeezer-plates in order to give the necessary amount of strength to the squeezer-plates.

I have described plate 263 as a fixed squeezer-plate for the reason that it is fixed in use. It is, however, adjustable in or out, to provide for thinner or thicker books, between ways 267, (see Fig. 7,) formed upon plate 260 and is locked in place after adjustment by a cap-plate 268, which is clamped down upon it and is secured to the ways by bolts 269. (See Figs. 1 and 7.)

Movable squeezer-plate 264 lies between ways 270 (see Fig. 7) on plate 260 and is held in place by a cap-plate 271, which, however, simply holds it in place, but does not clamp it, leaving it free to slide between the ways. Both of the squeezer-plates, as well as platform 233, are provided with grooves 245, (see Figs. 6 and 7,) which receive the wings upon pusher 247 freely.

272 (see Figs. 4, 5 and 7) denotes springs, the respective ends of which are connected to the movable squeezer-plate and cap-plate 271 and which act to move said squeezer-plate out of operative position. Platform 233 has upon its under side a boss 273 through which a rod 274 passes, the boss being locked to the rod by a set-screw 275. This rod is adapted to slide in bosses 276 on the under side of table 225. (See Figs. 1 and 5.) A spring 277 (see Fig. 5) is connected to one of the bosses 276 (the right as seen in Fig. 5) and to boss 273, the action of said spring being to move the platform toward the receiving position and retain it there, said position being indicated by dotted lines in Figs. 4, 5 and 6. At one end of rod 274 (the left as seen in Fig. 5) is a downwardly-extending arm 278, which is provided at its lower end with a set-screw 279 and with a check-nut 280 to retain the set-screw in position after adjustment.

281 (see Figs. 5 and 7) is an arm extending upward from cap-plate 271 to which a lever 282 is pivoted. The upper arm of this lever is engaged by the inner end of set-screw 279. The oscillation of this arm of the lever acts to move rod 274 toward the left, as seen in Fig. 5, and to move the platform from the position shown in dotted lines in Figs. 4, 5 and 6 to the position shown in full lines in said figures. This movement takes place just before the downward movement of pusher 247, so that when said movement takes place the book may be carried downward by the pusher without obstruction. The purpose of set-screw 279 in arm 278 is to provide such adjustment for the platform as may be necessary in use owing to lost motion or changes in thickness of the books. The rear end of platform 233 is supported only by rod 274, the front end of said platform resting on a ledge 283 formed upon table 225, said table being provided with an opening 284 in which the platform moves. The lower end of lever 282 is engaged by a lever 285, the forward end of which is pivoted to any suitable portion of the framework at the right end of the machine—in the present instance, to plate 260. (See Figs. 4 and 5 in connection with Fig. 8.)

286 denotes an arm extending upward from lever 285, (see Figs. 5, 7 and 8,) which carries a set-screw 287, the inner end of which engages the outer edge of the angle-plate 265 of movable squeezer-plate 264. (See dotted lines, Figs. 5 and 7.) The object of the set-screw is to determine the pressure exercised by the movable squeezer-plate upon a book lying between said plates, it being obvious that springs 272 will act to hold the angle-plate forming part of the movable squeezer-plate against the set-screw and will also act to move the squeezer-plate out of operative position as soon as the pressure exercised by lever 285 is relieved. A check-nut 288 serves to lock the set-screw in position after adjustment.

It will be obvious from what has already been said that the platform 233, upon which the books rest after being removed from the chains, is operated by lever 282, and that lever 282 is operated by lever 285, which also operates the movable squeezer-plate and is itself operated by cam 34. At the rear end of lever 285—that is, the end toward the front of the machine—is a roller 289, which engages the face of cam 34. 290 is a supplemental lever the forward end of which is pivoted to lever 285 and the rear end of which carries a roller 291, which is also adapted to engage the face of cam 34. It will be understood from the arrow in Fig. 8 that roller 291 will engage the face of cam 34 in advance of roller 289, and it will be noticed furthermore in said figure that the engaging-points of rollers 289 and 291 lie in different vertical planes, roller 291 being so located that when the face of the cam engages roller 289 said roller 291 will be moved forward wholly out of contact with the face of the cam, and lever 285 will receive additional movement, the purpose of which I shall presently fully explain.

I have made no attempt to define geometrically the location of rollers 289 and 291 relatively to the face of cam 34, as it is obvious that the arrangement of these parts may be greatly varied without departing from the principle of my invention, the object being to obtain through the engagement of one roller with the face of the cam a certain movement of lever 285 and to obtain a further movement of said lever in the same direction through the engagement of the second roller with the face of the cam. This additional movement which is effected by the engagement of roller 289 with the face of cam 34 is also subject to adjustment.

292 is a lug on the under side of lever 285, and 293 is a lug on the upper side of supplemental lever 290. 294 is a set-screw engaging these lugs, (see Figs. 8 and 8ª,) the parts being so arranged that rotation of the set-screw will oscillate supplemental lever 290 relatively to lever 285, so as to move the engaging-points of rollers 289 and 291 toward or from each other, thereby increasing or diminishing the additional movement imparted to lever 285 by the engagement of the second roller with the face of cam 34.

For the sake of clearness, before proceeding to describe other movements, I will explain the operation of the parts just described. As already stated, the books as they are moved forward from between the chains by pusher 227 are received upon platform 233, which lies in opening 284 in table 225 in the position shown in dotted lines in Figs. 4, 5, and 6, the cover at this time lying out flat upon said table 225 and the sides of the books being supported by vertical plates 244. An instant later platform 233 is moved from the position shown in dotted lines in Figs. 4, 5, and 6 to the position shown in full lines in said figures, leaving the backs of the books unsupported, this movement being effected, as just described, by means of levers 282 and 285. Simultaneously with the movement of the platform movable squeezer-plate 264 is moved forward toward its operative position through the engagement of roller 291 on lever 285 with the face of cam 34. This first movement of the movable squeezer-plate does not, however, interfere with the downward movement of the book. The effect of this movement, the parts having been properly adjusted in the manner already described, is to place the movable squeezer-plate in such a position that as the book is pressed downward between the two squeezer-plates the cover will be pressed up closely against the sides of the book. It will be noticed in Figs. 4 and 5 that the upper ends of the two squeezer-plates are rounded, so that as the covers are drawn over the upper ends thereof there will be no danger of tearing the covers, the rounded upper ends serving to close them up against the sides of the book. The instant the platform is out of the way pusher 247 begins to move downward, and at the instant the downward movement of the pusher is completed the movable squeezer-plate will again be moved forward through the engagement of roller 289 with the face of cam 34. The engagement of this roller with the face of the cam will throw roller 291 still farther forward, placing it entirely out of engagement with the cam and will impart additional movement to lever 285, the effect of which will be to move squeezer-plate 264 forward with sufficient force to clamp the book firmly and hold it, the sides of the cover being of course firmly pressed against the sides of the book. The book is now in position to be operated upon by the cover-setting roller. This roller, which I have designated by 295, (see Figs. 3, 4 and 7,) is at the forward end of a slide 296 which lies in trough 262. At the instant the book has been moved down by pusher 247 and has been clamped between the squeezer-plates by the second forward movement of squeezer-plate 264 slide 296 will be at the extreme of its forward movement, as indicated in dotted lines in Figs. 3 and 7. It will be noticed in Fig. 3 that the top of the roller lies slightly above the top of the slide and in such a position that when the backward movement of the slide takes place the roller will press firmly upon the back of the book, which firmly sets the cover in place thereon. During this backward movement, as already stated, the book will remain firmly clamped between the squeezer-plates, so that it will not be pressed upward by roller 295, but said roller will press firmly thereon to set the cover. At the instant, however, that the backward movement of the slide shall have been completed roller 289 will pass off from the face of cam 34, (see Fig. 8ª in connection with Fig. 8,) which will relieve the pressure of the movable squeezer-plate upon the book for the reason that springs 272 will at once move squeezer-plate 264 backward entirely out of the way so that the book will drop down into the trough by gravity. An instant later the forward movement of slide 296 takes place, said slide, in the present instance the roller thereon, now acting as an ejector and carrying the book forward out of the trough. The reciprocatory movement of this slide, which serves the double purpose of setting the covers upon the backs of the books and also of moving the covered books forward out of the machine, is derived from cam 28 through suitable intermediate connections.

297 denotes a rod the forward end of which is pivoted to the rear end of slide 296, the rear end of said rod being pivoted to an arm 298, which extends from a rock-shaft 299 journaled in the framework. (See Figs. 3 and 7.)

300 denotes another arm extending from rock-shaft 299.

301 denotes an arm having at its lower end a hub 302, which is journaled on cross-piece 208. This arm carries a roller 303, which engages a groove 304 in the face of cam 28. (See dotted lines, Fig. 3.)

305 denotes a link one end of which is pivoted to the outer end of arm 301, the other end of said link being pivoted to the outer end of arm 300 which extends outward from the rock-shaft. It will be readily apparent that each rotation of the cam must produce an oscillation of arm 301, which by means of link 305 and arm 300 will produce an oscillation of the rock-shaft and arm 298 to which rod 297 is pivoted and will cause a backward movement of the slide and cover-setting roller which sets the cover upon the back of the book and a forward movement of said slide which pushes the book out from the trough and onto a receiving-table 306, which is secured at the forward end of the trough in any suitable manner, as by a plate 307 attached to the under side of the receiving-table and the under side of the trough,(see Figs. 2 and 4,) and is supported by suitable lugs or standards 308. (See Fig. 1.)

309 (see Fig. 8ᵇ in connection with Figs. 1 and 2) denotes a plate secured to the under side of the receiving-table and extending outward therefrom. This plate is provided with a slot 310 and on its under side with lugs 311 through which a rod 312 reciprocates. 313 denotes a collar rigidly secured to this rod, and 314 an arm extending upward through the slot and having at its forward end a plate 315 to which is secured a board which serves as a pusher to move the covered books forward on the receiving-table and is designated as 316.

317 denotes springs secured to the bottom and outer wall 318 of the receiving-table. The free ends of these springs are curved upward and then over so as to leave smooth ends to rest against the cover of the last book received. Recesses 319 are provided in the bottom and outer side of the pusher to receive these springs, and holes 320 are formed in the bottom of the table and in the outer wall thereof to receive the ends of the springs. (See Figs. 2 and 8ª.)

321 denotes a suitable support against which the first book received from the machine is pressed by the pusher. This support is made heavy enough to retain the books in an upright position, and is moved forward the thickness of a book each time a book is received from the machine and moved forward laterally by the pusher. The pusher is reciprocated laterally to the machine by means of a lever 322, (see Figs. 3 and 8,) which is connected to the end of rod 312 by means of a link 323. Lever 322 is pivoted on a stud 324 which extends downward from the framework and carries at its rear end—that is, the end toward the front of the machine—a roller 325, (see Fig. 3, also dotted lines, Fig. 8,) which engages a groove 326 in cam 35. It will be apparent that each rotation of this cam will produce a forward and backward movement of rod 312 and pusher 316. As each book is pushed out of the machine by slide 296, the pusher will be at its extreme retracted position, as in Fig. 2. The instant the book is received the pusher begins to move forward, carrying the book before it and pressing springs 317 downward, the springs themselves lying in recesses 319 in the pusher, and the ends of the springs being pressed into holes 320 in the bottom and outer wall of the receiving-table. This permits the book to be pushed over the ends of the springs, the pusher itself stopping before it has passed off from the springs. An instant later the return movement of the pusher takes place, and the springs return to the position in which they are shown in Fig. 2 and retain the last book in an upright position.

The operation of the machine as a whole is briefly as follows: The books to be covered are stacked up on table 36 and the pile of covers is placed upon table F. The operator stands at the front end of the machine and places the books singly in front of pusher 42. Each reciprocation of this pusher carries a book forward far enough to be grasped firmly by the book-carrying chains C. As the books are carried along by the chains, they are held against falling open by vertical plates 226 between which they pass. The backs of the books pass over a glue-roller, which deposits sufficient glue on the back of each book, so that the cover will stick to it. The instant a book has passed off from the glue-roller the table rises and the top cover thereon adheres to the back of the book, the table moving forward a short distance with the book, so that the cover will not be removed therefrom. The table then drops downward obliquely out of the way and then moves backward into position to rise again and place a cover in contact with the back of the next book, special mechanism being provided which compensates before each rise of the table for the thickness of the cover last removed therefrom. An instant after the cover which has been attached to the back of a book passes off from table F it passes upon a table 225, still lying out flat. A pusher 227 now acts upon the book to push it out from between the chains and upon a platform 233 lying in an opening 284 in table 225. An instant later this platform is moved laterally out of the way and a pusher 247 moves the book downward between plates 263 and 264, which fold the sides of the cover against the sides of the book. An instant later one of these plates moves forward and clamps the book tightly between the said plates. While the book is held in this position a cover-setting roller passes backward over the back of the book and sets the cover firmly thereto. An instant later the pressure of the movable squeezer-plate is relieved and the book drops down into the trough in which the slide carrying the cover-setting roller reciprocates. An instant later this slide moves forward and carries the book out of the machine and onto the receiving-table. A pusher upon this table moves each book forward laterally out of the way as soon as it passes upon the table, in which position it is held by springs when the pusher moves backward to permit another book to be moved in front of it by the slide moving in the trough.

Having thus described my invention, I claim—

1. In a machine of the character described the combination with two endless carrying chains lying in the horizontal plane and mechanism for moving said chains in opposite directions so that their inner sides move forward, of a reciprocating pusher 42 which moves the books forward into position to be engaged by the chains and carried forward thereby, a glue roller, a table by which the covers are carried, and mechanism which raises the table when a book is in position to receive a cover and then lowers the table out of operative position.

2. The combination with frames A and B having vertical plates 226, carrying chains lying in the horizontal plane, sprocket wheels carrying said chains and journaled in the frames and mechanism for moving said chains in opposite directions with their inner sides moving forward so that books placed between the chains will be carried forward and the sides of the books will be supported by the vertical plates, of a glue roller, a table by which the covers are carried, and mechanism which raises the table when a book is in position to receive a cover and then lowers the table out of operative position.

3. The combination with the chain carrying frames, the chains and sprocket wheels in the frame by which the chains are carried, shafts 49 and 54 by which the driving sprocket wheels are carried, pinions on said shafts, a swinging arm journaled on shaft 49, idler pinions carried by said arm which engage each other and respectively engage the pinions carried by said shafts and suitable mechanism for rotating shaft 49 so that the chains will be moved in opposite directions their inner sides moving forward, of a glue roller, a table by which the covers are carried, and mechanism which raises the table when a book is in position to receive a cover and then lowers the table out of operative position.

4. The combination with the chain carrying frames, the chains and sprocket wheels in the frames by which the chains are carried, of shafts 49 and 54 by which the driving sprocket wheels are carried, pinions on said shafts, a swinging arm journaled on shaft 49, idler pinions carried by said arm which engage each other and respectively engage the pinions carried by said shafts, suitable mechanism for rotating shaft 49 so that the chains will be moved in opposite directions, lugs 88 on said frames and a screw 87 threaded to engage one of said lugs and turning freely in the other by which one of the frames may be adjusted toward or from the other.

5. The combination with the chain carrying frames, the chains and sprocket wheels in the frames by which the chains are carried, two part shaft 49 the upper portion of which is journaled in one of said frames and shaft 54 journaled in the other frame by which the driving sprocket wheels are carried, pinions on said shafts, a swinging arm journaled on shaft 49, idler pinions carried by said arm which engage each other and respectively engage the pinions carried by said shafts and suitable operating mechanism connected to the lower portion of shaft 49 by which movement in opposite directions is imparted to the chains, said frames, chains and the upper portion of shaft 49 being removable without displacement of the parts, of a glue roller, a table by which the covers are carried, and mechanism which raises the table when a book is in position to receive a cover and then lowers the table out of operative position.

6. The chain carrying frames each consisting essentially of upper plate 55 and lower plate 56, a web 61 by which the upper and lower plates are connected and a vertical plate 226 for the purpose set forth, in combination with a glue roller, a table by which the covers are carried, and mechanism which raises the table when a book is in position to receive a cover and then lowers the table out of operative position.

7. The carrying chains consisting essentially of outer links 65' which are pivoted together and carry studs 67 upon which rollers are journaled and between said outer links intermediate links 69 supported by blocks 70 through which the pivots pass.

8. The combination with the chain carrying frames consisting of upper and lower plates and a web between said plates, sprocket wheels journaled in said frames, chains carried by said sprocket wheels and consisting of links pivoted together and rollers journaled in said links which in use travel on the web, of a glue roller, a table by which the covers are carried, and mechanism which raises the table when a book is in position to receive a cover and then lowers the table out of operative position.

9. The combination with the chain carrying frames having upper and lower plates, a web between said plates and sprocket wheels journaled in said frames, chains carried by said sprocket wheels and lying in the horizontal plane, said chains consisting of links pivoted together, the backs of the inner sides of said chains lying toward each other, and mechanism for moving said chains in opposite directions the inner sides thereof moving forward so that books placed between said chains will be engaged by the backs of the links and carried forward thereby, of a glue roller, a table by which the covers are carried, and mechanism which raises the table when a book is in position to receive a cover and then lowers the table out of operative position.

10. The combination with carrying chains lying in the horizontal plane and mechanism for moving said chains in opposite directions so that their inner sides will move forward, of a glue roller over which the back of each book passes as it is carried forward by the chains, a table by which the covers are carried and mechanism by which the table is moved upward to place a cover upon the back of each book then moved forward and downward obliquely and then moved backward into position to rise again to place the next cover upon the next book placed in position by the chains.

11. The combination with carrying chains lying in the horizontal plane and mechanism for moving said chains in opposite directions so that their inner sides will move forward, of a glue roller over which the back of each book passes as it is carried forward by the chains, a table by which the covers are carried, mechanism for raising and lowering the table and mechanism acting during the downward movement of the table by which the downward movement is lessened a distance equal to the thickness of the cover last removed so that each time the table rises the top cover thereon will be placed in contact with the last book which has passed over the glue roller.

12. The cover table consisting of transverse slides 126, 127 and 128 each of which is provided with a slot 129, longitudinal strip 131 by which slides 126 and 128 are connected, longitudinal strip 132 secured to slide 127 and extending over the other slides, supports 136 at the outer edges of said strips against which the edges of the covers rest and bolts passing through the strips and through said slots by which the slides are adjusted to the desired width of covers.

13. The cover table consisting of transverse slides 126, 127 and 128 each of which is provided with a slot, longitudinal strip 131 by which slides 126 and 128 are connected, longitudinal strip 132 secured to slide 127 and extending over the other slides, bolts passing through the strips and through said slots by which the slides are adjusted to the desired width of covers and longitudinally adjustable supports G against which the rear end of the pile of covers rests.

14. The cover table consisting of transverse slides 126, 127 and 128 each of which is provided with a slot, longitudinal strip 131 by which slides 126 and 128 are connected, longitudinal strip 132 secured to slide 127 and extending over the other slides, flanges 133 at the outer edges of said strips, bolts passing through the strips and through said slots by which the slides are adjusted to the desired width of covers and supports G which are longitudinally adjustable on the flanges to provide for any required length of covers.

15. In a machine of the character described the combination with a cover carrying table having pins 144 extending from one side thereof, of platform 140 having at its forward end a flange against which the table rests and at its rear end a groove, a locking strip lying in said groove and having notches adapted to receive the pins by which the table is retained in place on the platform and mechanism by which the platform and table are raised and lowered as and for the purpose set forth.

16. The combination with the table and the platform, of a frame 151 having rollers upon which the platform rests whereby longitudinal movement of the platform and table relatively to the frame is permitted, mechanism for imparting upward, forward, downward and backward movements to the frame, platform and table, lever 218 pivoted to the platform and to the frame and a block 216 adapted to be engaged by said lever to return the table and platform to their normal position relatively to the frame when the backward movement takes place.

17. The combination with the table and platform, of a frame 151 having rollers upon which the platform rests whereby longitudinal movement of the platform and table relatively to the frame is permitted, mechanism for imparting upward, forward, downward and backward movements to the frame, platform and table, lever 218 fulcrumed on said frame, one end thereof being loosely pivoted to the platform and the other end bent backward at an angle and a block 216 adapted to be engaged by said lever to return the table and platform to their normal position relatively to the frame during the backward movement.

18. The combination with the table and platform, of a frame 151 having an arm 219 and rollers upon which the platform rests whereby longitudinal movement of the platform and table relatively to the frame is permitted, mechanism for imparting upward, forward, downward and backward movements to the frame, lever 218 fulcrumed on arm 219, one end of said lever being loosely pivoted to the platform, a block 216 adapted to be engaged by said lever to return the table and platform to their normal position during the backward movement and a stop 215 by which the backward movement of the table and platform relatively to the frame is determined.

19. In a machine of the character described the combination with the table and the platform having flanges 145 provided on their inner faces with grooves 146, of frame 151 having rollers upon which the platform rests, gibs 147 lying in said grooves and bearing against the sides of the frame and set screws for adjusting the gibs whereby the platform and table are retained against all except longitudinal movement relatively to the frame.

20. In a machine of the character described the combination with the cover table, frame and standard 153 by which the frame is carried and which is provided with a rack 154, of case 155 through which the standard passes, a slide 160 lying within the case and carrying a pinion 161 which engages the rack on the standard and supports the latter.

21. In a machine of the character described the combination with the cover table and standard, of a case through which the standard passes, mechanism for imparting vertical reciprocatory movement to the standard and mechanism for imparting longitudinal reciprocatory movement to the case together with the standard and parts carried thereby.

22. In a machine of the character described the combination with the cover table, standard and case, of a slide lying within the case and to which the standard is connected and mechanism for raising and lowering the slide and carrying with it the standard and parts supported thereby.

23. In a machine of the character described the combination with the cover table, the standard having a rack 154 and the case through which the standard passes and which is provided with a slot 167, of slide 160 within the case, a pinion carried by said slide which engages the rack, roller 165 carried by a stud which passes through said slot, lever 168 upon which the roller rests and mechanism for oscillating said lever whereby the slide, standard and parts carried thereby are raised and lowered.

24. The combination with the cover table and the standard by which it is carried and which is provided with a rack, of the case, slide 160 carrying pinion 161 engaging the rack and gear wheel 164 moving with said pinion, mechanism for raising and lowering the slide and with it the standard and parts carried thereby and mechanism for imparting slight rotation to the gear wheel and pinion during each downward movement of the slide whereby the standard is raised slightly relatively to the slide.

25. The combination with the cover table and the standard by which it is carried and which is provided with a rack, of the case, slide 160 carrying pinion 161 engaging the rack and gear wheel 164 moving with said pinion, stud 170 extending outward from said slide and carrying a pinion 169 engaging said gear wheel and a friction disk 171 moving therewith, friction wheel 173 journaled on said stud and having a recess to receive the friction disk and a nut 183 whereby the friction wheel is locked to the friction disk so that movement imparted to the friction wheel will be communicated by means of the pinions and gear wheel to the rack to impart upward movement to the standard relatively to the slide.

26. In a machine of the character described the combination with the cover table and standard, of the friction wheel, mechanism for imparting rotary movement to the friction wheel and mechanism intermediate said friction wheel and the standard whereby the latter is raised slightly at each actuation of the friction wheel.

27. In a machine of the character described the combination with the cover table and the standard having a rack 154, of slide 160 carrying a pinion engaging the rack, the friction wheel, mechanism for raising and lowering said parts, mechanism for imparting rotary movement to the friction wheel during the downward movement of said parts and mechanism intermediate the friction wheel and the pinion whereby the standard and the cover table are raised slightly relatively to the slide during each downward movement of the parts.

28. The combination with the cover table, standard, friction wheel, mechanism intermediate said standard and friction wheel whereby the standard is raised slightly relatively to the other parts at each movement of the friction wheel and mechanism for raising and lowering all of said parts together, of fixed arms 176 and 184, arms 180 and 181 pivoted concentrically with the friction wheel, link 185 pivoted to arms 181 and 184 and carrying a shoe 186 which holds the friction wheel against backward movement and link 191 pivoted to arms 176 and 180 and carrying a shoe 196 which acts during the downward movement to impart rotary movement to the friction wheel.

29. In a machine of the character described the combination with slide 160 having a stud 170 on which a friction wheel 173 is journaled and mechanism for raising and lowering said slide, of fixed arms 176 and 184, arms 180 and 181 pivoted on said stud, link 185 pivoted to arms 181 and 184 and carrying a shoe 186 engaging the periphery of the friction wheel at a point beyond the point of intersection therewith of a line passing through the centers of stud 170 and the pivotal point of link 185 to arm 184 and link 191 pivoted to arms 176 and 180 and carrying a shoe 196 engaging the periphery of the friction wheel at a point beyond the point of intersection therewith of a line passing through the centers of stud 170 and the pivotal point of link 191 to arm 176 so that during the upward movement of the slide the friction wheel is held against backward movement by shoe 186 and link 191 carrying shoe 196 is oscillated on its pivotal point, and during the downward movement of the slide shoe 196 engages the periphery of the friction wheel and imparts rotary movement thereto shoe 186 permitting the friction wheel to move forward.

30. The combination with the cover table, the standard having a rack, slide 160 carrying a pinion which engages the rack and a stud 170, a friction wheel journaled on said stud, connecting mechanism intermediate said friction wheel and said pinion and mechanism for raising and lowering said slide, of fixed arms 176 and 184, arms 180 and 181 pivoted on said stud, link 185 pivoted to arms 181 and 184 and carrying a shoe engaging the periphery of the friction wheel, link 191 pivoted to arms 176 and 180 and carrying a shoe 196 also engaging the periphery of the friction wheel and springs 189 and 197 which act to retain the shoes in contact with the periphery of the friction wheel.

31. The combination with slide 160 having a stud 170 on which a friction wheel 173 is journaled and mechanism for raising and lowering said stud, of fixed arm 184, fixed arm 176 having a slot 178, arms 180 and 181 pivoted on said stud, link 185 pivoted to arms 181 and 184 and carrying a shoe engaging the periphery of the friction wheel, link 191 having a slot 193, a bolt passing through said slots which serves as a pivot for link 191 on arm 176 and a thumb nut for locking said bolt in position after adjustment so that during the upward movement of the slide the friction wheel is held against backward movement by shoe 186, and link 191 carrying shoe 196 is oscillated on the bolt and during the downward movement of the slide shoe 196 engages the periphery of the friction wheel and imparts rotary movement thereto, the amount of rotary movement imparted to the friction wheel at each downward movement being determined by the adjustment of bolt 194 in the slots.

32. The combination with the cover table, the standard having a rack, slide 160 carrying a pinion which engages the rack and a stud 170, a friction wheel journaled on said stud, connecting mechanism intermediate said friction wheel and said pinion and mechanism for raising and lowering said slide, of fixed arm 184, fixed arm 176 having a slot 178, arms 180 and 181 pivoted on said stud, link 185 pivoted to arms 181 and 184 and carrying a shoe 186 engaging the periphery of the friction wheel, link 191 having a slot 193, a bolt passing through said slots which serves as a pivot for link 191 on arm 176 and means for locking said bolt in position after adjustment so that during the upward movement of the slide and table the friction wheel is held against backward movement by shoe 186 and link 191 carrying shoe 196 is oscillated on the bolt and during the downward movement of the slide and table shoe 196 engages the periphery of the friction wheel and imparts rotary movement thereto, the amount of rotary movement imparted to the friction wheel and consequently the amount of upward movement of the standard and table relatively to the slide during the downward movement of said parts being determined by the adjustment of the bolt toward or from the friction wheel.

33. The combination with the carrying chains lying in the horizontal plane, mechanism for moving said chains in opposite directions, the inner sides of said chains moving forward so that books placed between said chains are held and carried forward thereby, a glue roller over which the back of each book passes as it moves forward, the cover table, the standard having a rack, slide 160 carrying a pinion which engages the rack and a stud 170, a friction wheel journaled on said stud, connecting mechanism intermediate said friction wheel and said pinion and mechanism for raising said slide, standard and table and placing the top cover in engagement with the back of a book and for returning said parts to their normal position, of fixed arm 184, fixed arm 176 having a slot 178, arms 180 and 181 pivoted on said stud, link 185 pivoted to arms 181 and 184 and carrying a shoe 186 engaging the periphery of the friction wheel, link 191 having a slot 193 and a bolt passing through said slots which serves as a pivot for link 191 on arm 176 and a thumb nut for locking said bolt in position after adjustment so that during the upward movement of the slide and table the friction wheel is held against backward movement by shoe 186 and during the downward movement of said slide and table shoe 196 engages the periphery of the friction wheel and imparts rotary movement thereto, thereby raising the standard and table relatively to the slide a distance equal to the thickness of the cover last removed from the table so that at the next upward movement of the table the top cover will be placed in contact with the back of the next book.

34. In a machine of the character described the combination with the cover table, the standard having a rack, slide 160 having a pinion engaging the rack, a stud 170, a friction wheel journaled on said stud, connecting mechanism intermediate said pinion and said friction wheel and mechanism for raising and lowering said slide, of fixed arms 176 and 184, arms 180 and 181 pivoted on said stud, link 185 pivoted to arms 181 and 184 and carrying a shoe 186 engaging the periphery of the friction wheel, link 191 pivoted to arm 180 and an adjustable pivot by which said arm is connected to arm 176 by which the amount of rotary movement imparted to the friction wheel at each downward movement of the slide is determined.

35. In a machine of the character described the combination with the cover table, the standard having a rack, slide 160 having a pinion engaging the rack and a stud 170, a friction wheel journaled on said stud, connecting mechanism intermediate said pinion and said friction wheel and mechanism for raising and lowering said slide, of fixed arms 176 and 184, said arm 176 having a slot 178, arms 180 and 181 pivoted on said stud, link 185 pivoted to arms 181 and 184 and carrying a shoe 186 engaging the periphery of the friction wheel, link 191 pivoted to arm 180 and having a slot 193 and a shoe 196 engaging the periphery of the friction wheel and a bolt movable in said slots by which link 191 is pivoted to arm 176 whereby the amount of rotary movement imparted to the friction wheel at each downward movement of the slide is determined.

36. In a machine of the character described the combination with the cover table, the standard having a rack, slide 160 having a pinion engaging the rack and a stud 170, a friction wheel journaled on said stud, connecting mechanism intermediate said pinion and said friction wheel and mechanism for raising and lowering said slide, of fixed arms 176 and 184, said arm 176 having a slot 178, arms 180 and 181 pivoted on said stud, link 185 pivoted to arms 181 and 184 and carrying a shoe 186 engaging the friction wheel, link 191 pivoted to arm 180 and having a slot 193, a scale 199 and a shoe 196 engaging the friction wheel and a bolt passing through said slots and adjustable in connection with the scale by which said link is pivoted to arm 176, the amount of rotary movement imparted to the friction wheel and consequently the upward movement of the standard and cover table relatively to the slide at each downward movement of the slide being determined by the adjustment of the bolt in said slots.

37. The combination with the cover table, the standard having a rack, slide 160 having a pinion engaging the rack, a gear wheel 164 moving with said pinion and a stud 170, a pinion journaled on said stud and meshing with the gear wheel, a beveled friction disk moving with said pinion, a friction wheel journaled on said stud and having a recess to receive the friction disk and a hub 174 and mechanism for raising and lowering said slide, of fixed arms 176 and 184, arms 180 and 181 pivoted on said hub, link 185 pivoted to arms 181 and 184 and carrying a shoe 186 which engages the friction wheel, link 191 pivoted to arms 176 and 180 and carrying a shoe 196 which also engages the friction wheel and nut 183 by which the friction wheel is locked to the friction disk so that the table may be lowered to receive a new pile of covers by loosening said nut which relieves the engagement of the friction wheel with the friction disk and permits the cover table and standard to be pushed down and the pinions and gear wheel to be rotated backward without carrying the friction wheel.

38. The combination with the cover table, the standard having a rack, slide 160 carrying a pinion engaging the rack a gear wheel 164 moving therewith and a stud 170, a pinion journaled on said stud and engaging the gear wheel and having moving therewith a friction disk, and a friction wheel journaled on said stud and having a hub 174, of fixed arms 176 and 184, arms 180 and 181 pivoted on said hub, link 185 carrying a shoe 186 engaging the friction wheel, link 191 carrying a shoe 196 also engaging the friction wheel, springs acting to hold said shoes in the engaged position, a nut 183 for locking the friction wheel to the friction disk and mechanism for raising and lowering the slide, the parts being so constructed and arranged that when the slide is moved upward the cover table and standard are carried thereby and the friction wheel is not moved and when the slide is moved downward the friction wheel will be moved forward by shoe 196 and the standard will be moved upward relatively to the slide, and when nut 183 is loosened the cover table and standard may be pushed down, the pinions and gear wheel moving freely but without imparting movement to the friction wheel.

39. The combination with the cover table, the standard, case 155 through which the standard passes and cross piece 156 by which the case is carried, of mechanism for reciprocating the cross piece and parts carried thereby longitudinally and mechanism for reciprocating the standard and parts carried thereby vertically.

40. The combination with the cover table, the standard, case 155 through which the standard passes and cross piece 156 by which the case is carried, of mechanism for reciprocating the cross piece and parts carried thereby longitudinally, mechanism for reciprocating the standard and parts carried thereby vertically and mechanism acting during the downward movement of the cover table and standard for raising said parts slightly so that at each downward movement the table is carried downward a slightly decreased distance.

41. In a machine of the character described the combination with the carrying chains, mechanism for moving said chains in opposite directions their inner sides moving forward, a glue roller over which the back of each book is passed and a table upon which the covers are placed, of mechanism for reciprocating said table in the horizontal plane and mechanism for reciprocating said table in the vertical plane, the parts being so constructed and arranged that the table will move upward and place a cover upon the back of a book between the chains, will then move forward with the book permitting the cover to become firmly attached thereto, will then move downward and then backward into position to move upward to place the next cover on the next book.

42. In a machine of the character described the combination with the carrying chains, mechanism for moving said chains in opposite directions their inner sides moving forward, a glue roller over which the back of each book is passed and a table upon which the covers are placed, of mechanism for reciprocating said table in the horizontal plane, mechanism for reciprocating said table in the vertical plane the parts being so constructed and arranged that the table will move upward and place a cover upon the back of a book between the chains, will then move forward, then downward obliquely and then backward into position for the next upward movement and mechanism acting through the downward movement to raise the table slightly so that at each downward movement the table is carried downward a slightly decreased distance to compensate for the cover last removed so that at the next upward movement the top cover will be placed upon the back of the next book.

43. The combination with the carrying chains, mechanism for moving said chains in opposite directions their inner sides moving forward, a glue roller over which the back of each book is passed, a table upon which the covers are placed, a standard by which the table is carried and mechanism intermediate said standard and table which permits longitudinal movement of the table independently of the standard, of mechanism for reciprocating said standard in the horizontal plane and mechanism for reciprocating said standard in the vertical plane, the parts being so constructed and arranged that the table will move upward and place a cover upon the back of a book between the chains will then move forward and downward obliquely and will then move backward into position for the next upward movement.

44. In a machine of the character described the combination with the cover table, standard, slide 160 to which the standard is connected and which carries a roller 165, case 155 and cross piece 156 by which the case is carried, of lever 168 which engages said roller, a cam for oscillating said lever and a cam and intermediate connecting mechanism whereby said cross piece, slide, &c., are reciprocated independently of the movement imparted to the slide by lever 168.

45. The combination with the chain carrying frames, the chains lying in the horizontal plane, mechanism for moving said chains in opposite directions their inner sides moving forward, a glue roller over which the backs of the books are passed, a table upon which the covers are placed and a standard by which it is carried, of mechanism for moving said table upward, vertically movable stop 209 carried with the table which is engaged by the forward end of a book between the chains thereby centering the book relatively to the pile of covers, a guide in which said stop is held by friction, said stop engaging one of the chain carrying frames when the upward movement takes place and being pushed down even with the top of the pile of covers, mechanism for moving the standard and table forward and mechanism intermediate said standard and table which permits forward movement of the table independently of the standard.

46. The combination with frames A and B, the carrying chains and the glue roller, of a table, a guide 210, a standard by which the table is carried, mechanism for imparting longitudinal reciprocatory movement to the standard and table, mechanism for imparting vertical reciprocatory movement to the standard and table, stop 209 in said guide which engages one of the frames when the upward movement takes place and is moved down even with the top of the pile of covers and is itself engaged by the front end of a book between the chains, mechanism intermediate the standard and the table whereby longitudinal movement of the table independently of the standard is permitted, lever 211 and mechanism acting while the table is at the lowered position to raise stop 209 into position to be engaged by the forward end of the next book.

47. The combination with the carrying chains, the glue roller, the table, a platform by which the table is carried and a frame having rollers upon which the platform rests and which permit the platform and table to move longitudinally independently of the frame, of mechanism for moving said table, platform and frame upward and downward, mechanism for moving said table, platform and frame forward and backward, lever 218 pivoted to the platform and to the frame, and a block by which said lever is engaged to return the table and platform to their normal position relatively to the frame.

48. The combination with the carrying chains, the glue roller, the table, a platform by which the table is carried and a frame having rollers upon which the platform moves independently of the frame, of mechanism for moving said table, platform and frame upward and downward, mechanism for moving said table, platform and frame forward and backward, lever 218 pivoted to the platform and to the frame, block 216 by which said lever is engaged to move the table backward relatively to the frame before the upward movement and a stop 215 by which said backward movement is determined.

49. The combination with frames A and B, the carrying chains, the table and the platform having a guide 210, of mechanism for moving said table and platform upward and downward, mechanism for moving said table and platform forward and backward, stop 209 held by friction even with the top of a pile of covers on the table and mechanism for raising the stop while the table and platform are at the lowered position into position to be engaged by the forward end of a book between the chains.

50. The combination with frames A and B, the carrying chains, the glue roller, the table the platform having a guide 210 and the frame having rollers upon which the platform moves independently of the frame, of mechanism for moving said table, platform and frame upward and downward, mechanism for moving said table, platform and frame forward and backward, stop 209 held by friction in the guide and adapted to be moved downward even with the top of a pile of covers on the table by engagement with one of the frames when the upward movement takes place, mechanism for raising the stop while the table, platform and frame are at the lowered position into position to be engaged by the forward end of a book between the chains, the table and platform moving on said rollers independently of the frame, and mechanism for returning the table and platform to their normal position relatively to the frame before the next upward movement takes place.

51. The combination with the chain carrying frames having vertical plates 226, said plates being provided with slots 230 opposite each other, chains in said frames by which the books are moved forward, the glue roller and mechanism for placing a cover on the back of each book, of platform 233 lying forward of the chains, slide 228 moving in guides upon one of the vertical plates and a spring actuated pusher carried by said slide and lying in said slots, said parts being so constructed and arranged that the book while being carried along by the chains will move the pusher out of the way and pass it the latter then dropping back to place behind the book after which a forward movement of the slide and pusher moves the book out from the chains and onto the platform.

52. The combination with vertical plates 226 having slots 230, the carrying chains and platform 233, of slide 228 having stop wall 232, pusher 227 pivoted at the forward end of said slide and lying in said slots and a spring the normal action of which is to hold the pusher within the slots and against the wall, the book as it is carried along by the chains acting to displace the pusher against the power of the spring until the book has passed the pusher, the spring then returning the pusher to its normal position back of the book after which a forward movement of the slide and pusher carries the book out from between the chains and onto the platform.

53. The combination with the chain carrying frames having vertical plates 226 said plates being provided with slots 230 opposite each other, chains in said frames by which the books are moved forward, the glue roller and mechanism for placing a cover on the back of each book, of table 225 lying forward of the chains and provided with an opening 284, platform 233 lying in said opening and pusher 227 by which the book is moved forward onto the platform the cover being supported by the table.

54. The combination with chains for carrying the books, mechanism for placing a cover on the back of each book, platform 233 and table 225, of pusher 227 by which the book is moved forward from the chains onto the platform, the cover lying flat upon the table.

55. The combination with chains for carrying the books, mechanism for placing a cover on the back of each book, platform 233 and table 225, of pusher 227 by which the book is moved forward from the chains onto the platform, the cover lying flat upon the table, slide 228 by which the pusher is carried and mechanism for imparting reciprocatory movement to the slide.

56. The combination with chains for carrying the books, mechanism for placing a cover on the back of each book, platform 233 and table 225, of pusher 227, a spring acting to hold said pusher in operative position and adapted to yield as a book is pushed past it, slide 228 by which the pusher is carried, cam 29 and mechanism intermediate said cam and said slide by which reciprocatory movement is imparted to the latter.

57. The combination with the carrying chains, mechanism for placing a cover on the back of each book and pusher 227, of platform 233 upon which the books are placed by the pusher, table 225 upon which the covers rest, plates 244, pusher 247 squeezer plates 263 and 264 lying below plates 244, mechanism for moving platform 233 out of the way and mechanism for reciprocating pusher 247, the downward movement of said pusher acting to press the book down between the squeezer plates and the latter acting to fold the covers against the sides thereof.

58. In a machine of the character described the combination with platform 233, mechanism for placing a book thereon, plates 244 which support the sides of the book, table 225 upon which the cover rests and squeezer plates 263 and 264 lying below plates 244, of mechanism for moving the platform laterally and pusher 247 by which the book is pressed down between the squeezer plates and the cover folded to the sides thereof.

59. In a machine of the character described the combination with platform 233, mechanism for placing a book thereon, adjustable plates 244 which support the sides of the book and squeezer plates 263 and 264 lying below plates 244, said plates 244 and the platform and squeezer plates having grooves 245, of mechanism for moving the platform laterally, pusher 247 having wings adapted to move in said grooves and mechanism for reciprocating said pusher whereby the book is pressed down between the squeezer plates and the cover folded to the sides thereof.

60. In a machine of the character described the combination with platform 233, mechanism for placing a book thereon, plates 244 which support the sides of the book and squeezer plates 263 and 264 lying below plates 244, of mechanism for moving the platform 244, of mechanism for moving the platform laterally and pusher 247 by which the book is pressed down between the squeezer plates and the cover folded to the sides thereof, the upper ends of said squeezer plates being rounded so as to avoid danger of tearing the covers.

61. In a machine of the character described the combination with platform 233 and squeezer plates 263 and 264, of mechanism for moving the platform laterally and pusher 247 by which the book is pressed down between the squeezer plates after the lateral movement of the platform.

62. In a machine of the character described the combination with the platform, mechanism for moving said platform laterally and the squeezer plates, of suitable means for adjusting said squeezer plates and pusher 247 by which the book is pressed down between the squeezer plates as and for the purpose set forth.

63. In a machine of the character described the combination with the platform, mechanism for moving said platform laterally and the squeezer plates, of pusher 247 by which the book is moved down between the squeezer plates and the cover folded to the sides thereof after the movement of the platform, mechanism for moving one of said squeezer plates inward whereby the book is clamped and held and a reciprocating slide carrying a roller 295 by which the cover is set upon the back of the book.

64. In a machine of the character described the combination with the platform, mechanism for moving said platform laterally and the squeezer plates, of pusher 247 by which the book is moved down between the squeezer plates and the cover folded to the sides thereof, trough 262 lying below the squeezer plates, a slide reciprocating in said trough and carrying cover setting roller 295, mechanism acting to move one of said squeezer plates inward to clamp the book and then release it permitting it to drop down into the trough and mechanism for reciprocating said slide, the backward movement thereof taking place while the book is held between the squeezer plates and setting the cover upon the back of the book and the forward movement taking place after the book has dropped into the trough and expelling it therefrom.

65. In a machine of the character described the combination with the squeezer plates and pusher 247, of the platform, rod 274 to which it is connected, lever 282 by which said rod is actuated to move the platform from under the pusher and a spring acting to return said rod and the platform to their normal position.

66. In a machine of the character described the combination with the squeezer plates and pusher 247, of the platform, rod 274 to which it is connected and which is provided with an arm 278, lever 282, a set screw in said arm which is engaged by the lever to move the rod and platform in one direction and a spring acting to return the rod and platform to their normal position when the pressure of the lever is relieved.

67. In a machine of the character described the combination with table 225 having an opening 284 and bosses 276 and platform 233 lying in said opening, of rod 274 which slides in said bosses and to which the platform is connected, arm 278 carried by said rod and having a set screw 279, lever 282 which bears against the set screw to move said rod and platform in one direction and a spring acting to return the rod and platform to their normal position.

68. In a machine of the character described the combination with chains by which the books are carried, the glue roller, a table by which the covers are carried, mechanism which raises the table each time a book is in position to receive a cover and then lowers the table out of operative position, squeezer plate 263 and squeezer plate 264 having an angle plate 265, of lever 285 having an arm 286 and a set screw in said arm which bears against said plate to move squeezer plate 264 to its operative position.

69. In a machine of the character described the combination with platform 233, sliding rod 274 by which it is carried, and squeezer plates 263 and 264, of lever 285 which engages squeezer plate 264, a lever 282 one end of which engages rod 274 the other end engaging lever 285 so that when lever 285 is moved in one direction the squeezer plate 264 will be moved inward and rod 274 and the platform will be moved outward.

70. In a machine of the character described the combination with platform 233 adapted to receive a book, plates 244 which support the sides of the book and table 225 upon which the attached cover rests, of squeezer plates 263 and 264, levers 282 and 285 and intermediate connections by which the platform is moved outward and squeezer plate 264 is moved inward, and pusher 247 acting an instant later to press the book downward between the squeezer plates whereby the cover is folded to the sides of the book.

71. In a machine of the character described the combination with squeezer plates 263 and 264, of lever 285 by which squeezer plate 264 is moved inward and which carries a roller 289, supplemental lever 290 carried thereby and which carries a roller 291 and a cam 34 which is first engaged by roller 289 to oscillate said lever and move squeezer plate 264 inward to a predetermined position and is afterward engaged by roller 291 to move said squeezer plate farther inward as and for the purpose set forth.

72. In a machine of the character described the combination with squeezer plates 263 and 264, of lever 285 having a lug 292 and carrying a roller 289, supplemental lever 290 pivoted to lever 285 and having a lug 293 and carrying a roller 291, a set screw engaging said lugs by which roller 291 may be adjusted relatively to roller 289 and a cam 34 which is first engaged by roller 289 to oscillate said lever and move squeezer plate 264 inward to a predetermined position and is afterward engaged by roller 291 to move said squeezer plate farther inward as and for the purpose set forth.

73. In a machine of the character described the combination with pusher 247 and squeezer plates 263 and 264, of lever 285 by which squeezer plate 264 is moved inward and which carries a roller 289, supplemental lever 290 carried thereby and which carries roller 291, and a cam 34 which is first engaged by roller 289 to oscillate said lever and move squeezer plate 264 inward to position to fold the cover to the sides of the book when it is pushed downward between said plates by the pusher and is then engaged by roller 291 to move squeezer plate 264 into position to clamp the book firmly, and cover setting roller 295 by which the cover is set upon the back of the book while it is clamped by the squeezer plates.

74. In a machine of the character described the combination with pusher 247, and squeezer plates 263 and 264, of lever 285 by which squeezer plate 264 is moved inward and which carries a roller 289, supplemental lever 290 carried by lever 285 and which carries a roller 291, a cam 34 which is first engaged by roller 289 to oscillate said lever and move squeezer plate 264 inward to position to fold the cover to the sides of the book when it is pushed downward between said squeezer plates by the pusher and is then engaged by roller 291 to move squeezer plate 264 into position to clamp the book firmly, trough 262, slide 296 moving in said trough and carrying a cover setting roller which sets the cover to the back of the book while it is clamped by the squeezer plates after which the pressure of the squeezer plates is relieved the book dropping down into the trough from which position it is expelled by the forward movement of the slide.

75. In a machine of the character described the combination with the fixed squeezer plate, the movable squeezer plate and pusher 247, of slide 296 carrying cover setting roller 295 and mechanism for moving the squeezer plate into position to fold the cover to the sides of the book when it is pushed downward between said plates by the pusher and for moving said squeezer plate inward a second time to clamp the book between said plates in which position the cover is set thereon by the cover setting roller said mechanism then relieving the pressure upon the squeezer plate and permitting the book to drop down from which position it is expelled by the slide.

76. In a machine of the character described the combination with the fixed squeezer plate, the movable squeezer plate and pusher 247, of mechanism for moving the squeezer plate inward into position to fold the cover to the sides of the book when it is pressed downward between the squeezer plates by the pusher.

77. The combination with plates 244, the platform, table 225, the fixed squeezer plate, the movable squeezer plate and pusher 247, of slide 296 carrying cover setting roller 295, mechanism for moving the platform from beneath the book and mechanism for moving the squeezer plate into position to fold the cover to the sides of the book when it is pushed downward between the squeezer plates by the pusher and for moving the squeezer plate inward a second time to clamp the book between said plates in which position the cover is set by the cover setting roller, said mechanism then relieving the pressure upon the squeezer plate and permitting the book to drop down from which position it is expelled by the slide.

78. In a machine of the character described the combination with platform 233 adapted to receive a book back downward plates 244 which support the sides of the book and table 225 upon which the attached cover rests, of the fixed squeezer plate, the movable squeezer plate, levers 282 and 285 and intermediate connections by which the platform is moved outward and the movable squeezer plate is moved inward, pusher 247 acting an instant later to press the book downward between the squeezer plates whereby the cover is folded to the sides of the book, the movable squeezer plate then moving inward again and clamping the book, a slide carrying a roller which sets the cover upon the back of the book, the pressure of the squeezer plate then being removed and the book dropping down and said slide acting to expel the book.

79. In a machine of the character described the combination with plates 244, the platform and the fixed and movable squeezer plates, said plates and said platform having grooves 245, of pusher 247 having wings lying in said grooves, mechanism for moving the platform laterally out of the way of the pusher, rod 248 by which the pusher is carried, lever 253, a link connecting said lever and rod and a cam by which the lever is oscillated to reciprocate said rod and pusher.

80. In a machine of the character described the combination with receiving table 306 and slide 296, of plate 309 extending outward from the receiving table and provided with a slot 310 and lugs 311, pusher 316 secured to a plate 315 upon an arm 314, said arm passing through the slot and having at its lower end a collar 313, rod 312 which slides in said lugs and to which collar 313 is secured and suitable means for reciprocating said rod by which the pusher is moved laterally on the receiving table and carries the books out of the way as fast as they are passed to the table by slide 296.

81. In a machine of the character described the combination with carrying chains by which the books are carried backs downward, and a glue roller, of a table by which the covers are carried, mechanism for moving said table upward and downward, and mechanism for moving said table forward and backward the forward movement of said table being at a greater speed than the speed of the book carried by the chains and the downward movement commencing before the forward movement is finished so that the movement of the table is forward and downward obliquely at greater speed than the book is moving whereby a second cover is prevented from adhering to the cover attached to the back of a book.

82. The combination with the carrying chains operating substantially as described and a glue roller, of a table by which the covers are carried, mechanism for reciprocating said table in the horizontal plane and mechanism for reciprocating said table in the vertical plane, the parts being so arranged and timed that the table will move upward and place a cover upon the back of a book between the chains, will then move forward and downward obliquely at a greater speed than the book is moving so that the pile of covers is dragged forward and downward away from the cover attached to the book, the table then moving backward into position for the next upward movement.

83. In a machine of the character described the combination with chains by which the books are carried backs downward, a glue roller, a table by which the covers are carried and a standard by which the table is carried, of a cross piece by which the standard is carried, mechanism for reciprocating the standard vertically in the cross piece and mechanism for reciprocating the cross piece longitudinally of the machine, the operation of said parts being so timed that after the upward movement of the standard and table by which the top cover is attached to a book between the chains the forward movement of the table will be at greater speed than the book is moving and the downward movement will commence before the forward movement is finished so that the table and covers are dragged forward and downward away from the book and the adhesion of a second cover to the attached cover is prevented.

84. In a machine of the character described the combination with chains by which the books are carried backs downward, a glue roller, a table by which the covers are carried and a standard by which the table is carried, of a cross piece by which the standard is carried, cam 32 and lever 168 by which the standard is reciprocated in the cross piece, cam 27 having a groove 27ª and mechanism intermediate said cam and the cross piece by which the latter is reciprocated longitudinally, said groove 27ª being so laid out as to cause forward movement of the cross piece, standard and table at greater speed than the book is carried forward by the chains as and for the purpose set forth.

85. In a machine of the character described the combination with chains by which the books are carried and a glue roller, of a table by which the covers are carried and which is provided with angle pieces 137, mechanism for reciprocating said table in the horizontal plane, and mechanism for reciprocating said table in the vertical plane, the parts being so arranged and timed that the table will move upward and place a cover upon the back of a book between the chains and will then move forward and downward obliquely at a greater speed than the book is moving, angle pieces 137 pressing the attached cover forward causing it to crinkle slightly so that danger of a second cover adhering to the attached cover is prevented.

86. The combination with carrying chains by which the books are carried backs downward and a glue roller, of a table by which the covers are carried and which is provided with angle pieces 137 against which the rear ends of the covers rest and mechanism operating substantially as described and shown which raises the table and permits the top cover to adhere to the back of the book, then moves the table forward with the book between the chains and then moves the table forward and downward obliquely at a greater speed than a book between the chains is moving so that angle pieces 137 will press against the attached cover and crinkle it slightly the table with the pile of covers thereon being dragged forward and downward away from the attached cover so that the adhesion thereto of a second cover is prevented.

87. The combination with carrying chains by which the books are carried backs downward and a glue roller, of a table by which the books are carried and which is provided with angle pieces 137, a standard by which the table is carried, mechanism intermediate said standard and table by which the table is permitted to move forward independently of the standard, mechanism for moving the standard and table upward and downward and mechanism for moving the standard and table forward and backward, the downward movement of the standard and table commencing before the forward movement is finished and the forward movement from the instant the downward movement commences being at greater speed than the books are carried by the chains so that the attached cover will be crinkled slightly by angle pieces 137 and the pile of covers on the table will be dragged forward and downward away from the attached cover as and for the purpose set forth.

88. The combination with carrying chains by which the books are carried backs downward and a glue roller, of a table by which the books are carried and which is provided at its rear end with angle pieces 137 and at its forward end with a sliding stop 209 which is adapted to be engaged by the forward end of a book between the chains, a standard by which the table is carried, mechanism intermediate said standard and table by which the table is permitted to move forward independently of the standard, for the purpose set forth when stop 209 is engaged by the book, mechanism for moving the standard and table upward and downward and mechanism for moving the standard and table forward and backward, the downward movement of the standard and table commencing before the forward movement is finished and the forward movement from the instant the downward movement commences being at a greater speed than the books are carried by the chains so that the attached cover will be crinkled slightly by angle pieces 137 and the pile of covers on the table will be dragged forward and downward away from the attached cover.

In testimony whereof I affix my signature in presence of two witnesses.

BENNETT S. LEWIS.

Witnesses:
A. M. WOOSTER,
S. V. RICHARDSON.